United States Patent
Noda et al.

(10) Patent No.: US 8,214,587 B2
(45) Date of Patent: Jul. 3, 2012

(54) STORAGE APPARATUS AND METHOD FOR CONTROLLING STORAGE APPARATUS

(75) Inventors: Takashi Noda, Odawara (JP); Takashi Ochi, Odawara (JP); Yoshihito Nakagawa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 435 days.

(21) Appl. No.: 12/526,834

(22) PCT Filed: May 26, 2009

(86) PCT No.: PCT/JP2009/002321
§ 371 (c)(1),
(2), (4) Date: Aug. 12, 2009

(87) PCT Pub. No.: WO2010/137065
PCT Pub. Date: Dec. 2, 2010

(65) Prior Publication Data
US 2011/0320726 A1     Dec. 29, 2011

(51) Int. Cl.
*G06F 12/00* (2006.01)
(52) U.S. Cl. ........ 711/113; 711/130; 711/147; 711/154; 711/163; 711/E12.001
(58) Field of Classification Search .................. 711/113, 711/130, 147, 154, 163
See application file for complete search history.

(56) References Cited

U.S. PATENT DOCUMENTS

| | | |
|---|---|---|
| 2004/0267829 A1 | 12/2004 | Hirakawa et al. |
| 2005/0033885 A1 | 2/2005 | Nakayama et al. |
| 2007/0174544 A1 | 7/2007 | Yasuda et al. |
| 2009/0307385 A1* | 12/2009 | Hiramatsu et al. ............... 710/21 |
| 2010/0281211 A1* | 11/2010 | Ooigawa et al. ............... 711/114 |

FOREIGN PATENT DOCUMENTS

| | | |
|---|---|---|
| EP | 1 621 992 A2 | 2/2006 |
| JP | 2005-018506 A | 1/2005 |

* cited by examiner

*Primary Examiner* — Kevin Ellis
*Assistant Examiner* — Mehdi Namazi
(74) *Attorney, Agent, or Firm* — Mattingly & Malur, PC

(57) ABSTRACT

A storage apparatus has a channel board 11; a drive board 13; a cache memory 14; a plurality of processor boards 12 that transfer data; and a shared memory 15. The channel board 11 stores a frame transfer table 521 containing information indicative of correspondence between a LDEV 172 and each of the processor boards 12, set in accordance with a right of ownership that is a right of access to the LDEV 172. The processor boards 12 store LDEV control information 524 in a local memory 123, which is referred to by the processor board at the time of access. The channel board 11 transfers a data frame that forms the received data I/O request, to one of the processor boards 12 corresponding to the LDEV 172 specified from the information contained in the frame by using the frame transfer table 521.

14 Claims, 20 Drawing Sheets

[Fig. 1]
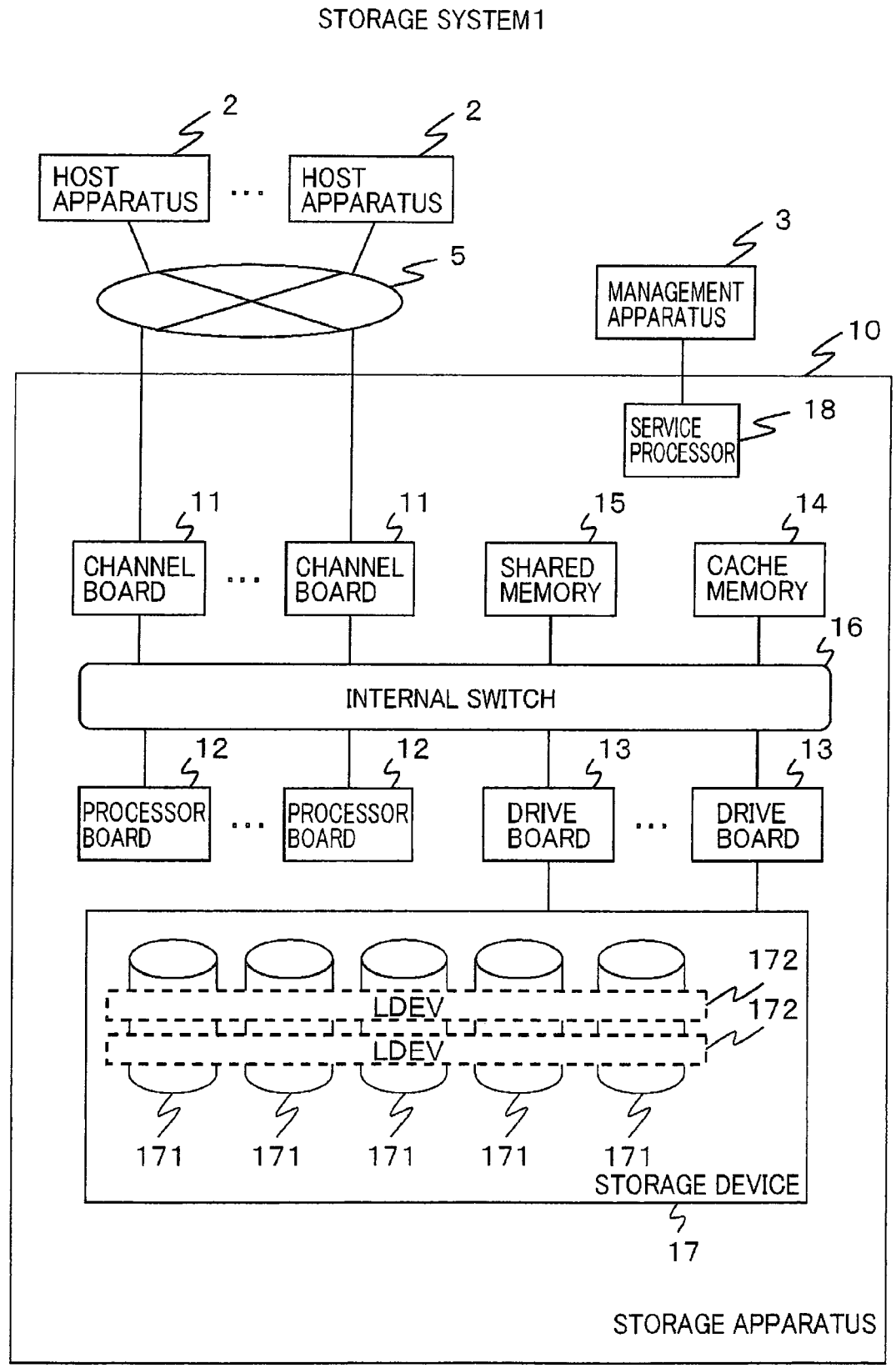

[Fig. 2A]
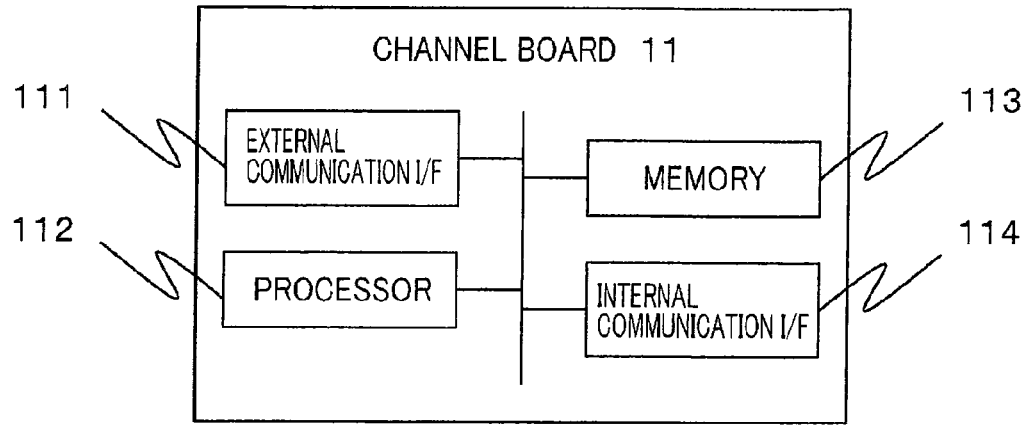
[Fig. 2B]
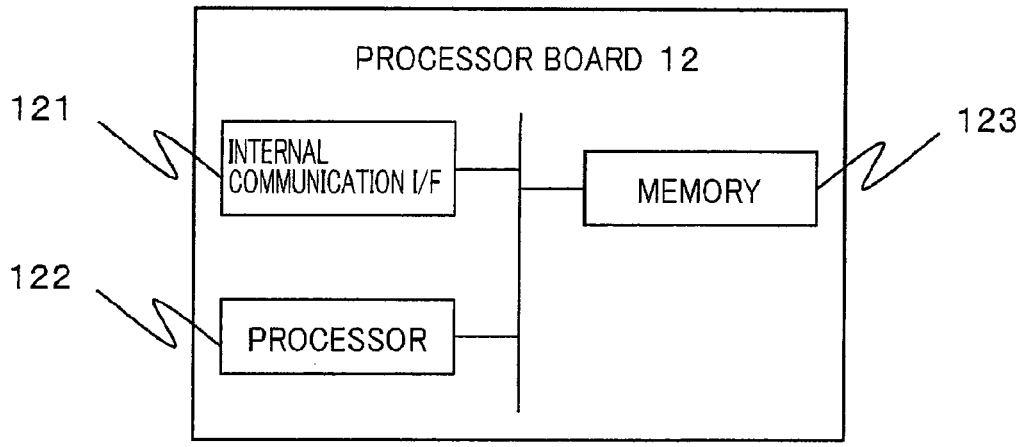
[Fig. 2C]
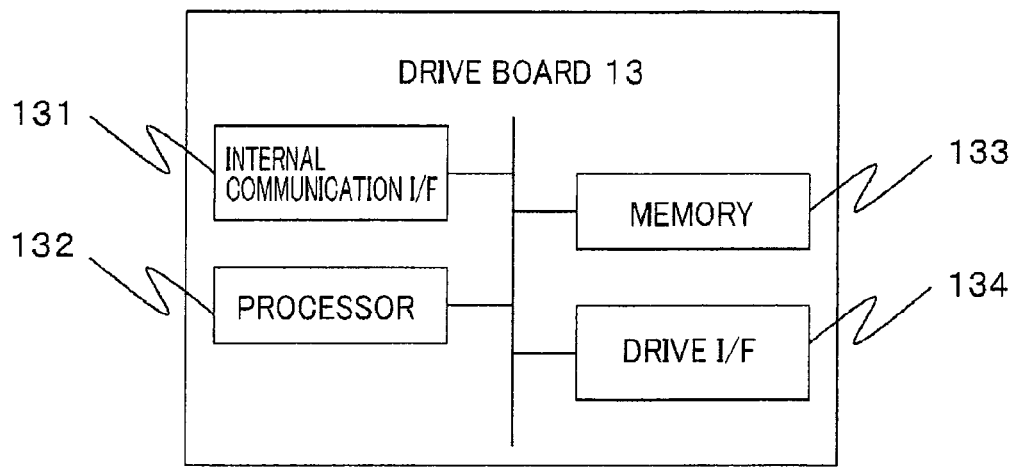

[Fig. 3]
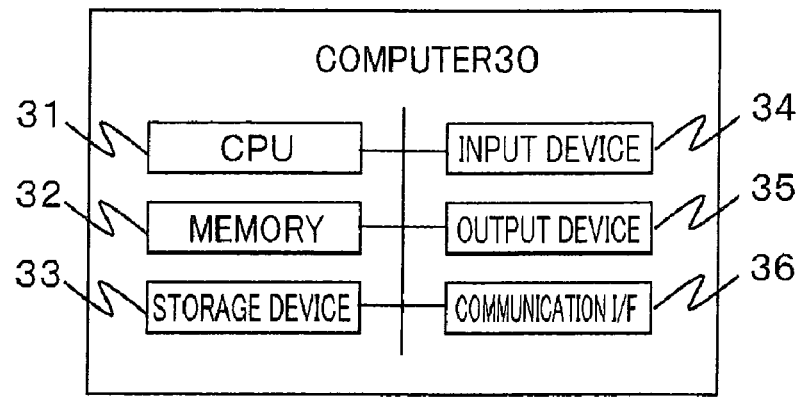
[Fig. 4]
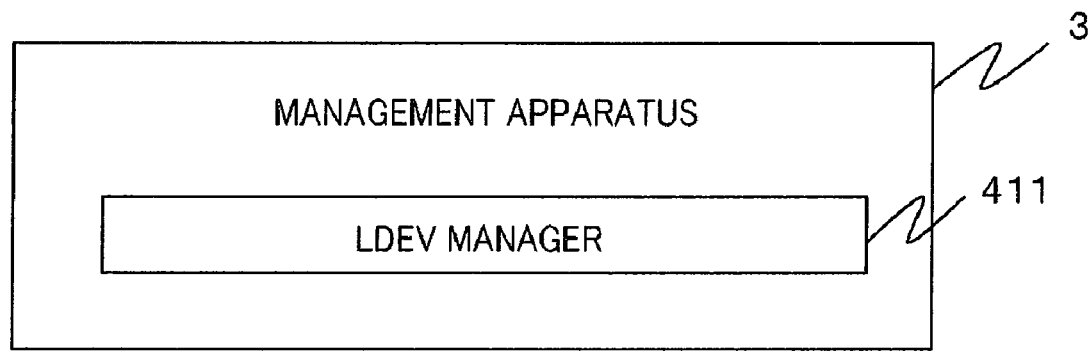

[Fig. 5]
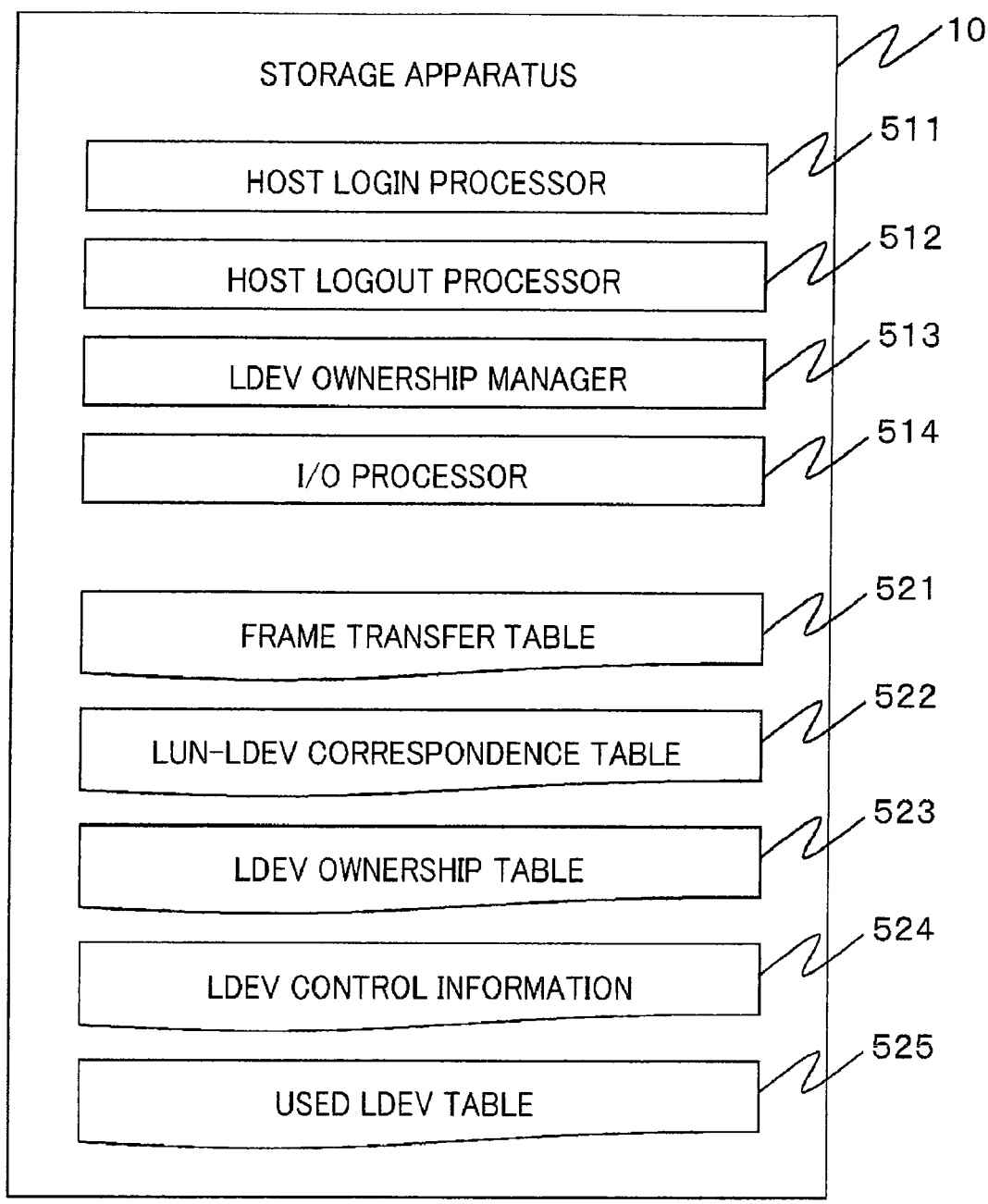

[Fig. 6]
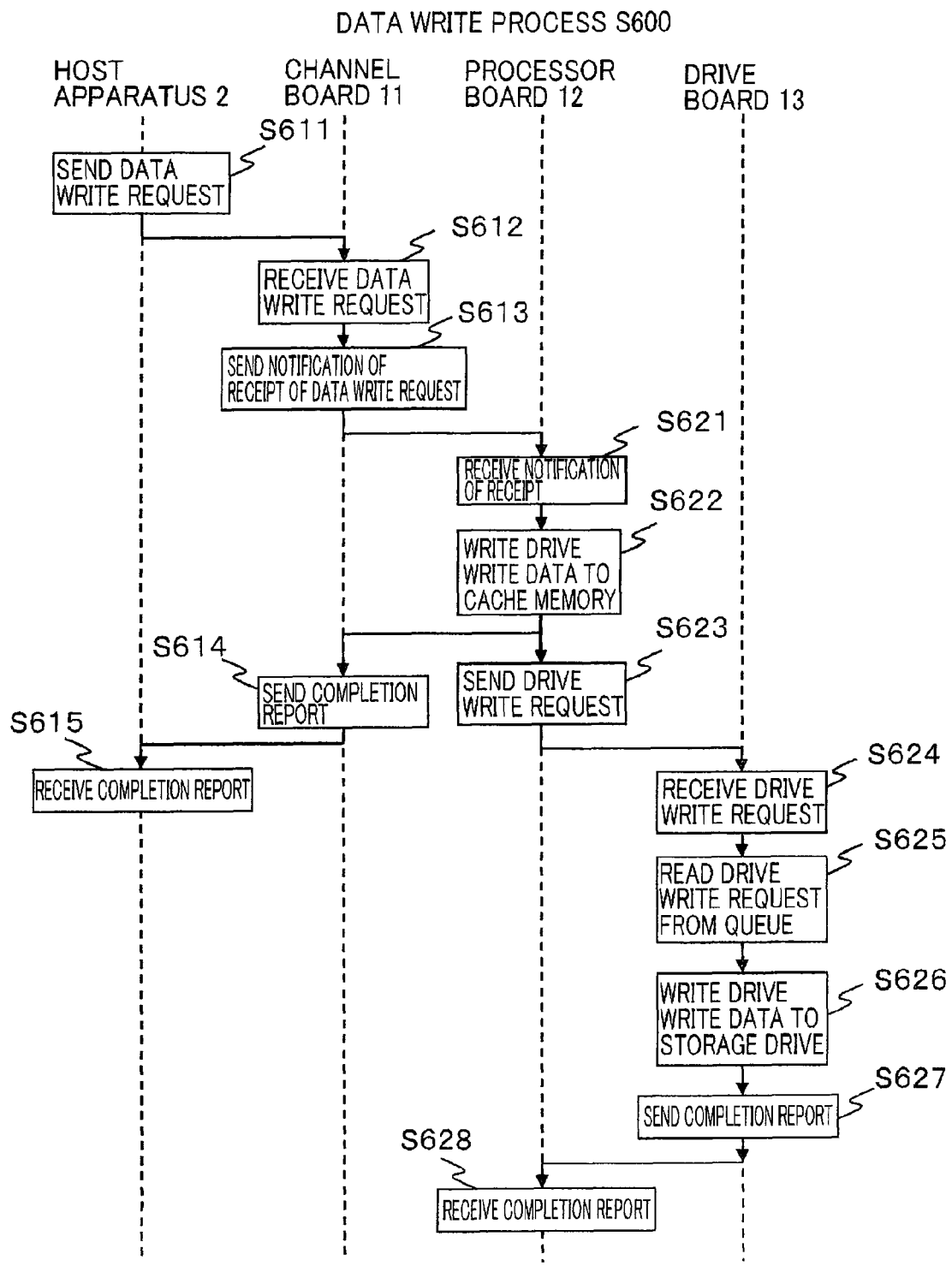

[Fig. 7]
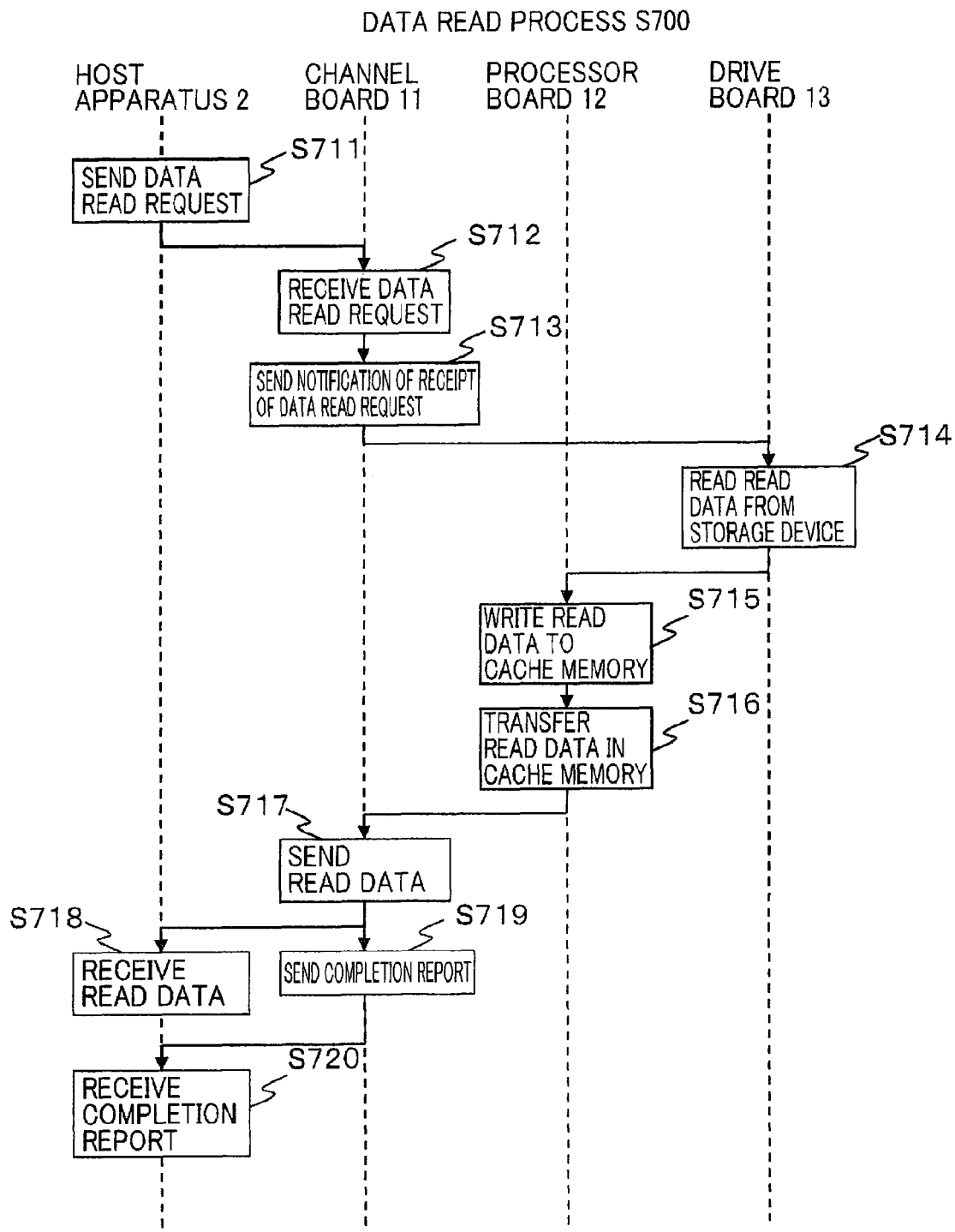

[Fig. 8]
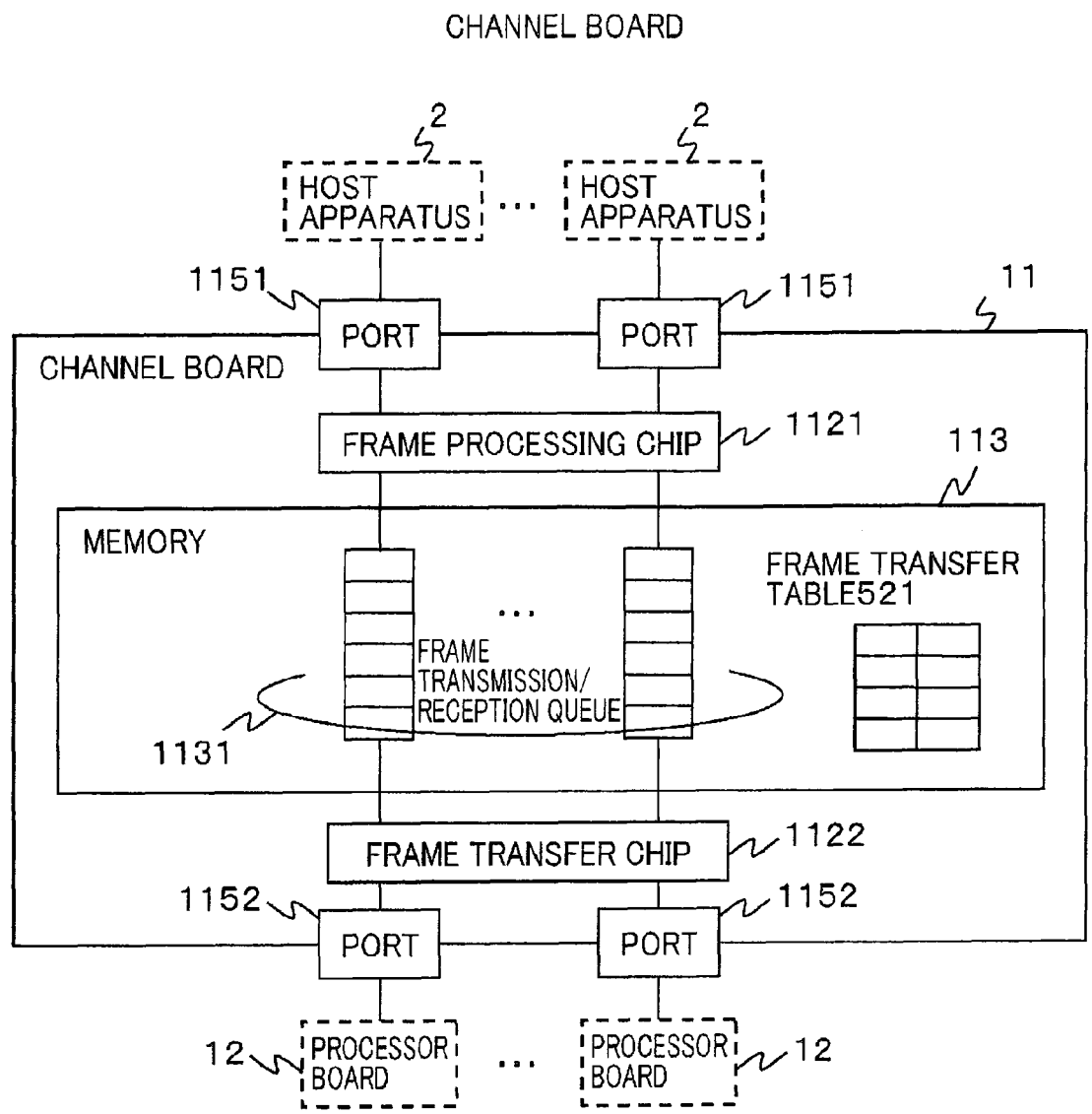

[Fig. 9]
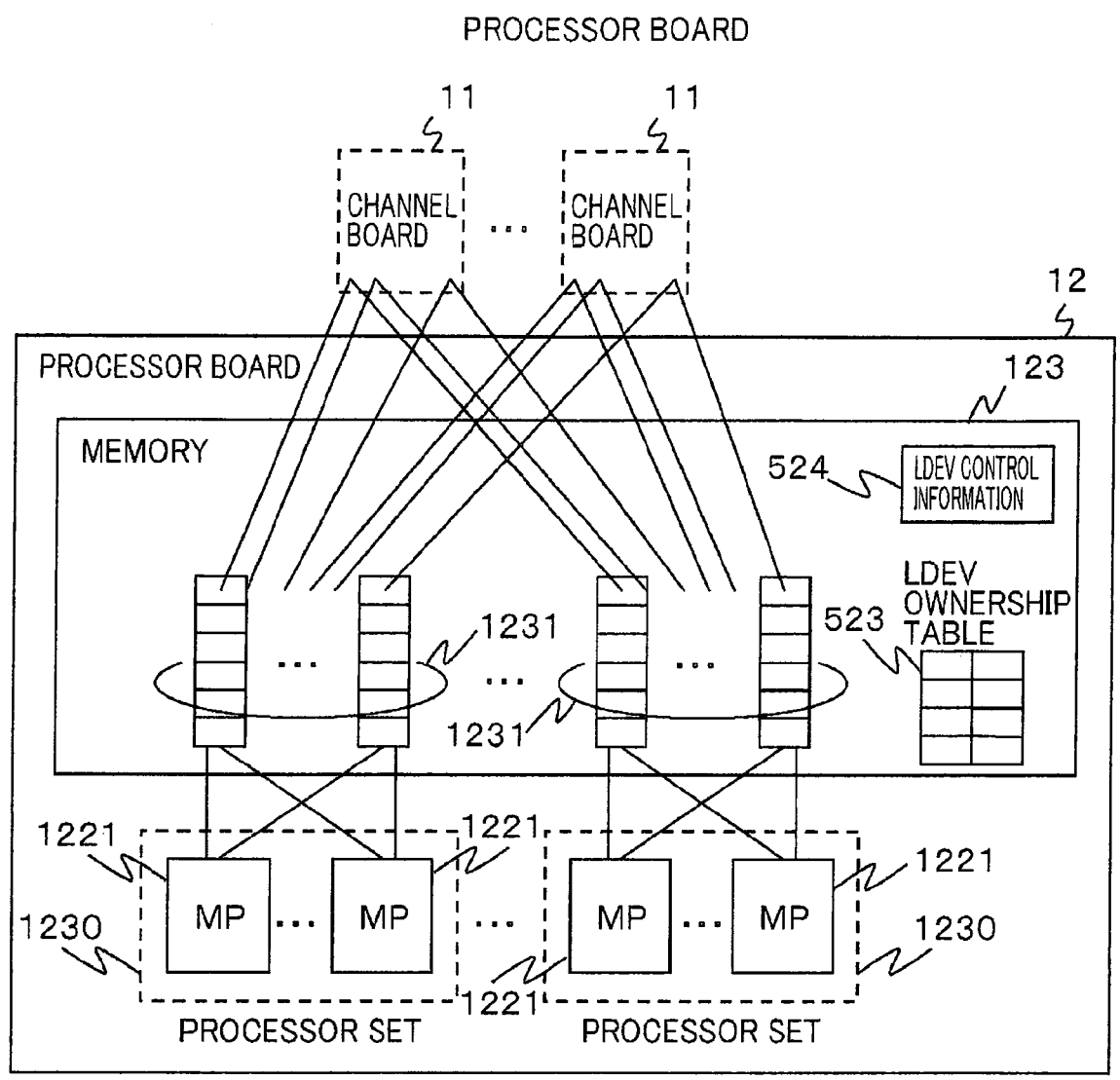

[Fig. 10A]
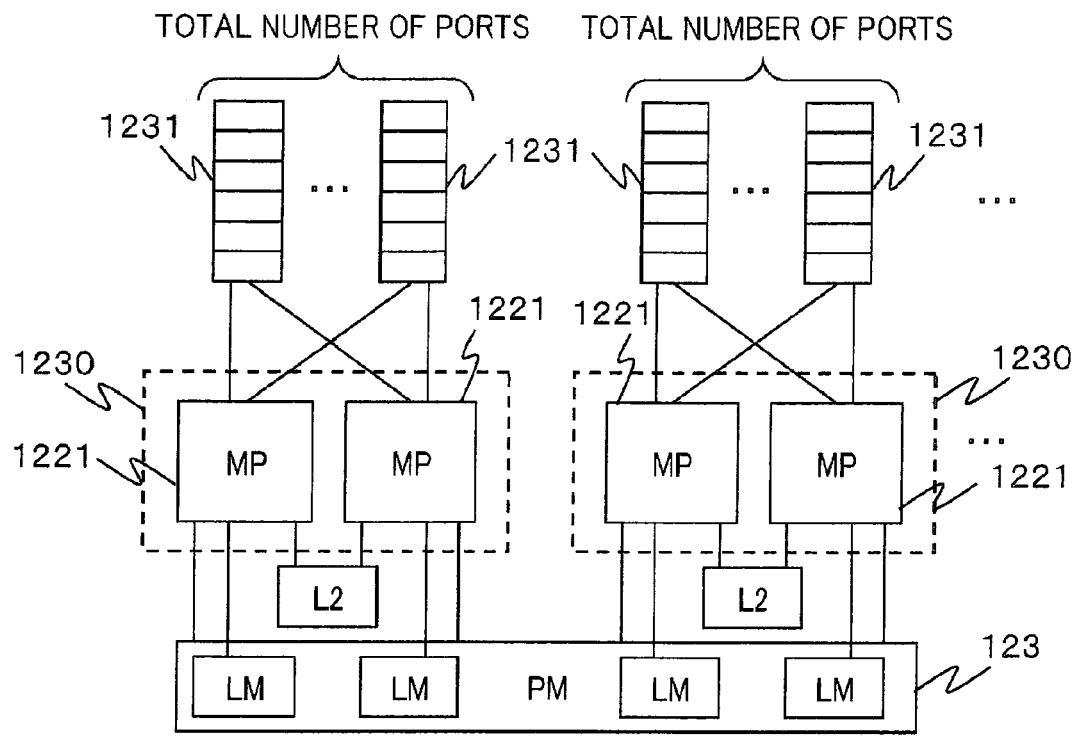
[Fig. 10B]
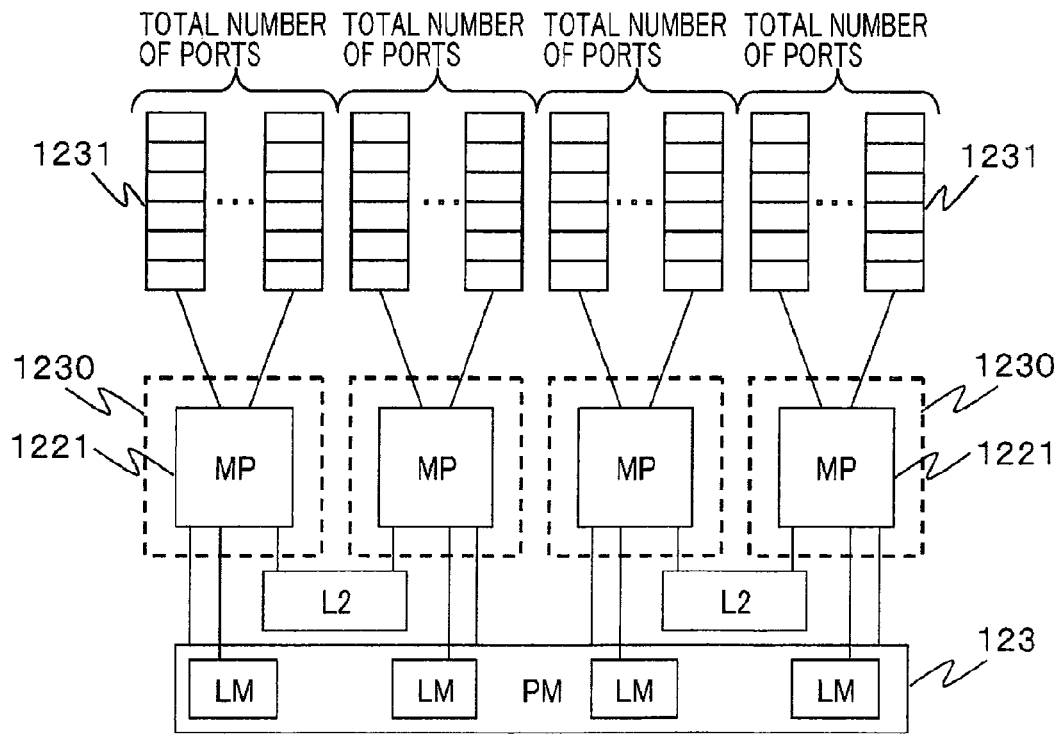

[Fig. 10C]
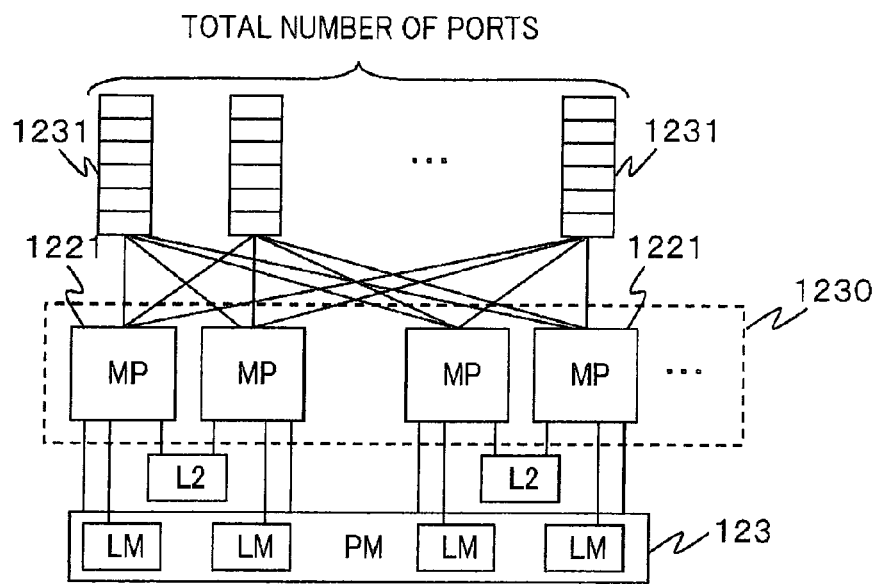
[Fig. 11A]
FRAME STRUCTURE
(COMMON TO AUTHENTICATION FRAME AND I/O FRAME)
[Fig. 11B]
I/O FRAME STRUCTURE (DATA WRITE REQUEST)
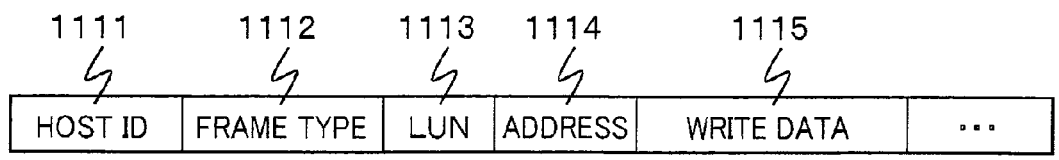

[Fig. 11C]

I/O FRAME STRUCTURE (DATA READ REQUEST)

| HOST ID | FRAME TYPE | LUN | ADDRESS | DATA LENGTH | ... |
|---|---|---|---|---|---|
| 1111 | 1112 | 1117 | 1118 | 1119 | |

[Fig. 12]

FRAME TRANSFER TABLE 521

HOST ID SEARCH TABLE 5211

| PORT ID | ENTRY NUMBER | VALID/ INVALID | HOST ID |
|---|---|---|---|
| 0 | 0 | VALID | 00.00.28 |
| ... | 1 | VALID | 00.00.01 |
| | ... | ... | ... |
| 0 | 1023 | INVALID | - |
| 1 | 0 | INVALID | - |
| ... | ... | ... | ... |
| 1 | 1023 | VALID | 00.01.F0 |
| 7 | 0 | INVALID | - |
| ... | ... | ... | ... |
| 7 | 1023 | INVALID | - |

| 1211 | 1212 | 1213 | 1214 |

PROCESSOR SET SEARCH TABLE 5212

| PORT ID | ENTRY NUMBER | LUN | VALID/ INVALID | PROCESSOR SET ID |
|---|---|---|---|---|
| 0 | 0 | 0 | VALID | 0 |
| | | 1 | VALID | 1 |
| | ... | ... | ... | ... |
| | 0 | 2047 | INVALID | - |
| | 1 | 0 | INVALID | - |
| ... | ... | ... | ... | ... |
| | 1 | 2047 | VALID | 7 |
| | 1023 | 0 | INVALID | - |
| | ... | ... | ... | ... |
| 0 | 1023 | 2047 | INVALID | - |
| 1 | 0 | 0 | INVALID | - |
| ... | | ... | | ... |
| 1 | 1023 | 2047 | INVALID | - |
| ... | | ... | | ... |
| 7 | 0 | 0 | INVALID | - |
| | | ... | | ... |
| 7 | 1023 | 2047 | INVALID | - |

| 1221 | 1222 | 1223 | 1224 | 1225 |

[Fig. 13]
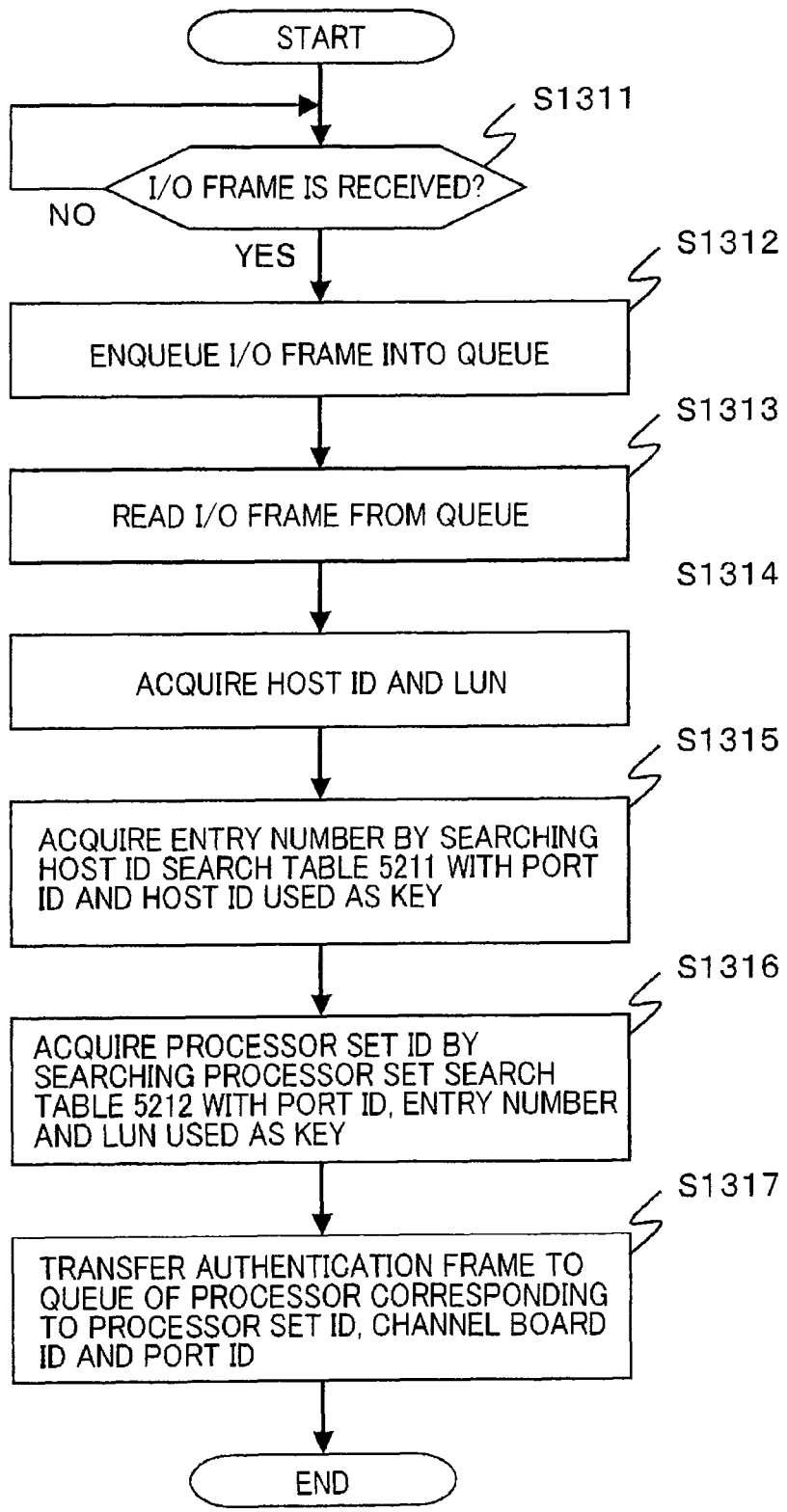

[Fig. 14]

LUN-LDEV CORRESPONDENCE TABLE 522

| CHANNEL BOARD ID 1411 | PORT ID 1412 | ENTRY NUMBER 1413 | LUN 1414 | LDEV-ID 1415 |
|---|---|---|---|---|
| 0 | 0 | 0 | 0 | 0 |
| 0 | 0 | 0 | 1 | 1 |
| 0 | 0 | 0 | 2 | 2 |
| ... | ... | ... | ... | ... |
| 31 | 7 | 1023 | 2047 | 65535 |

[Fig. 15]

LDEV OWNERSHIP TABLE 523

| LDEV-ID 1511 | PROCESSOR BOARD ID 1512 |
|---|---|
| 0 | 0 |
| 1 | 0 |
| 2 | 1 |
| ... | ... |
| 65535 | 7 |

[Fig. 16]
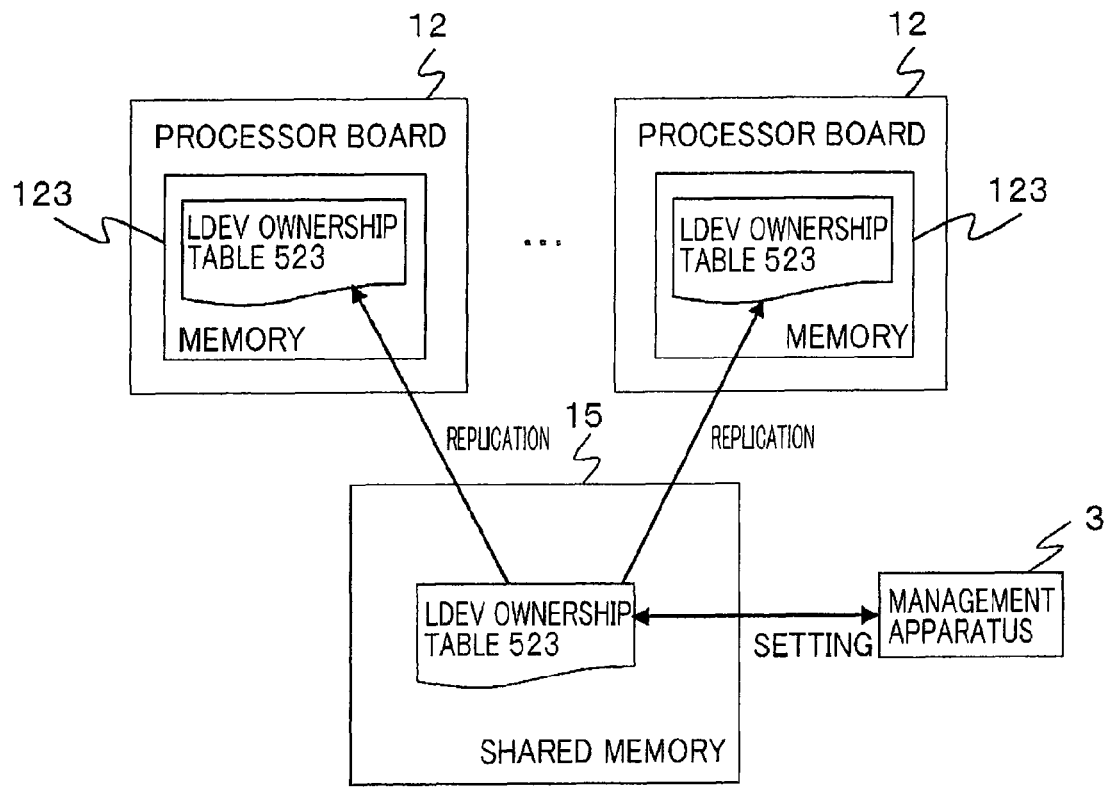
[Fig. 17]
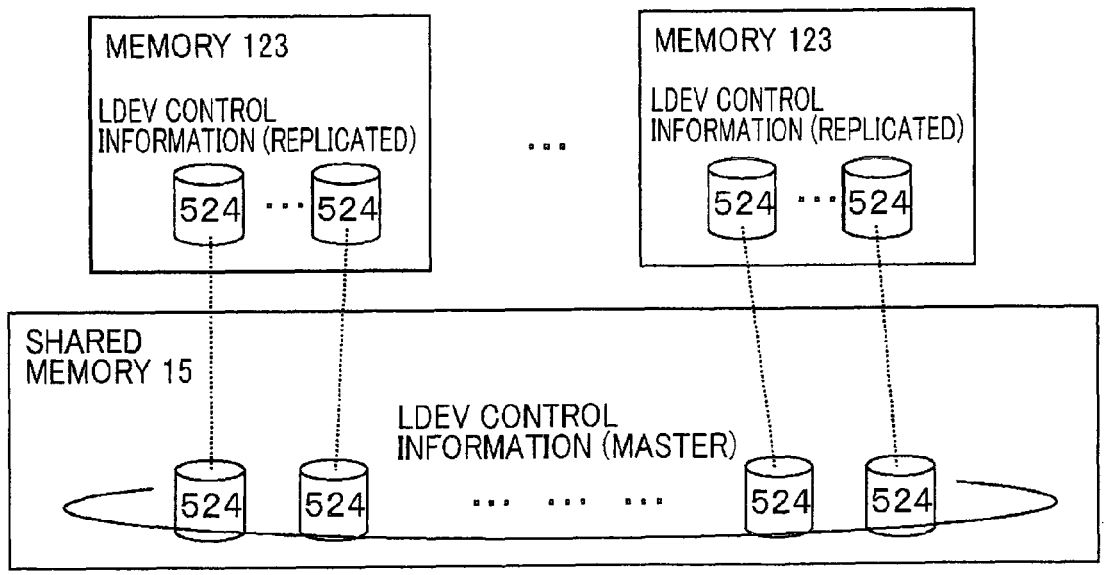

[Fig. 18]
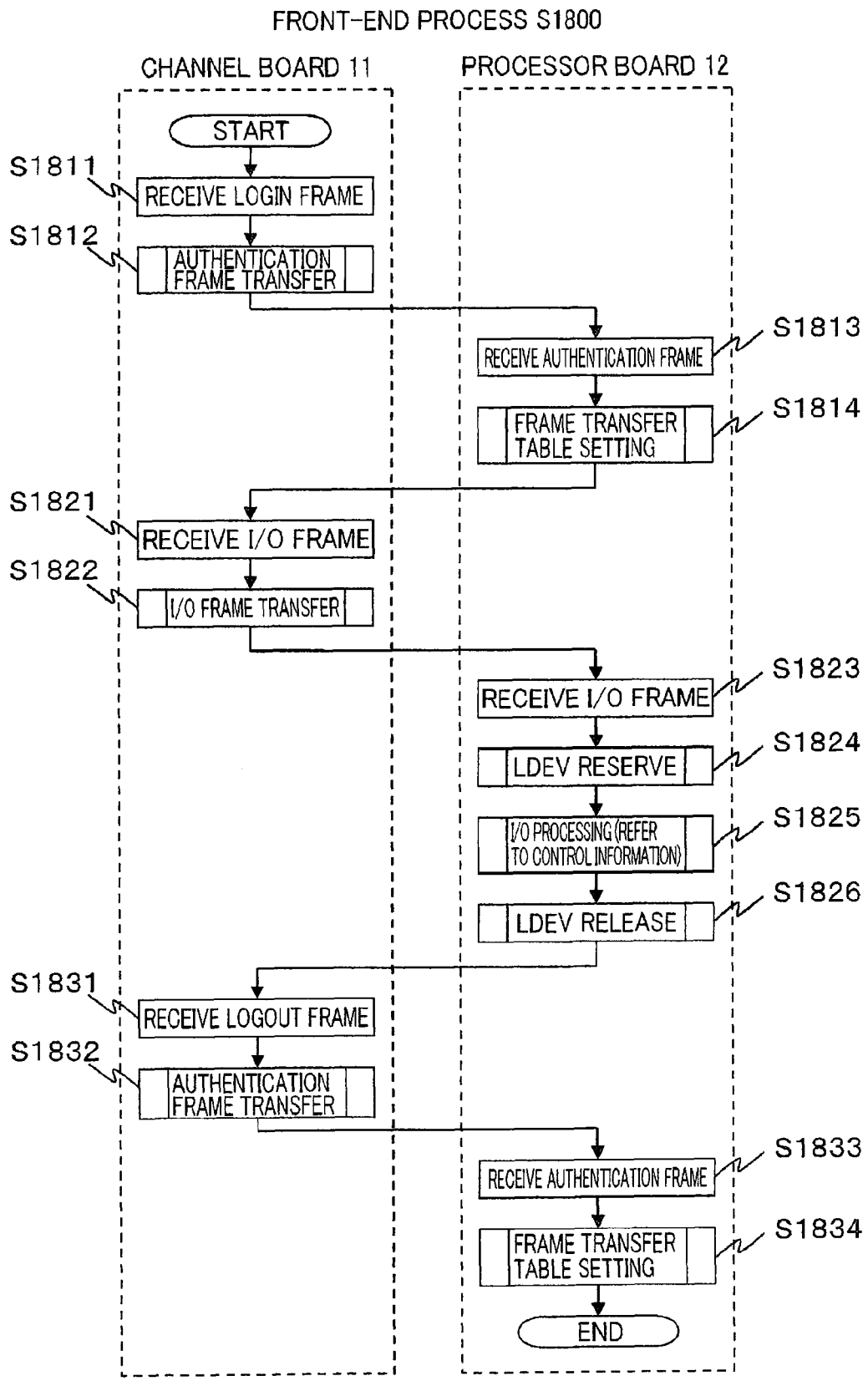

[Fig. 19]
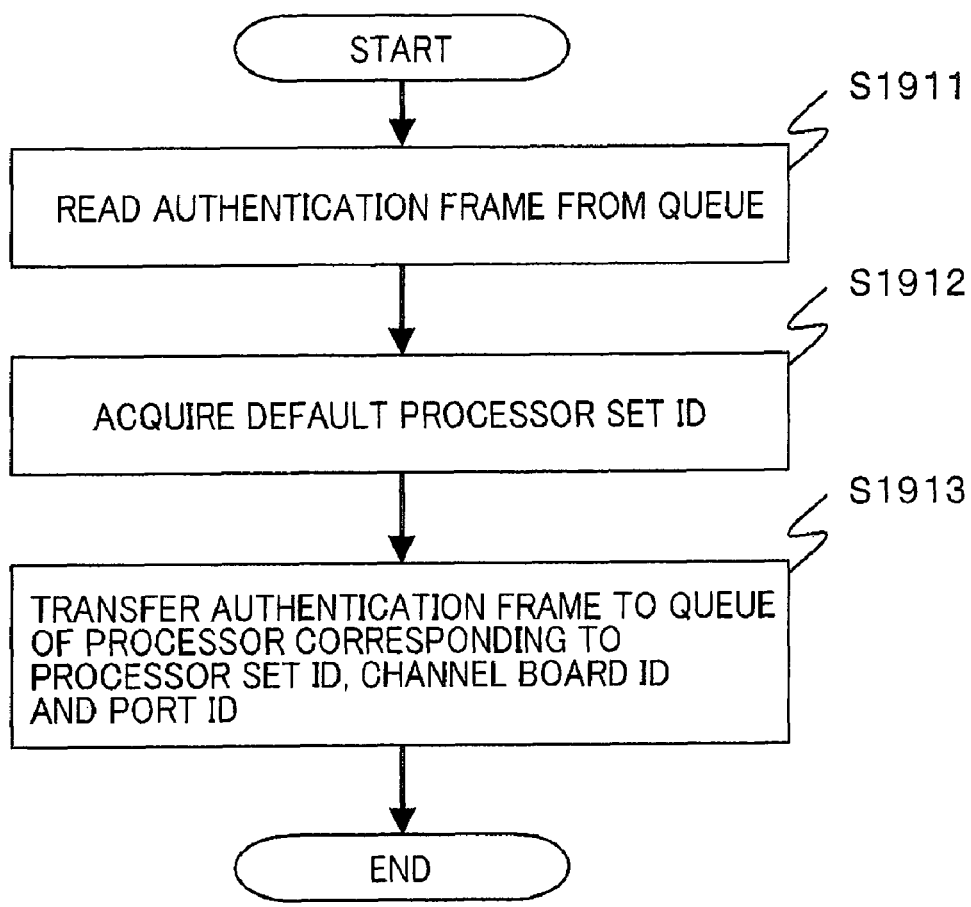

[Fig. 20]
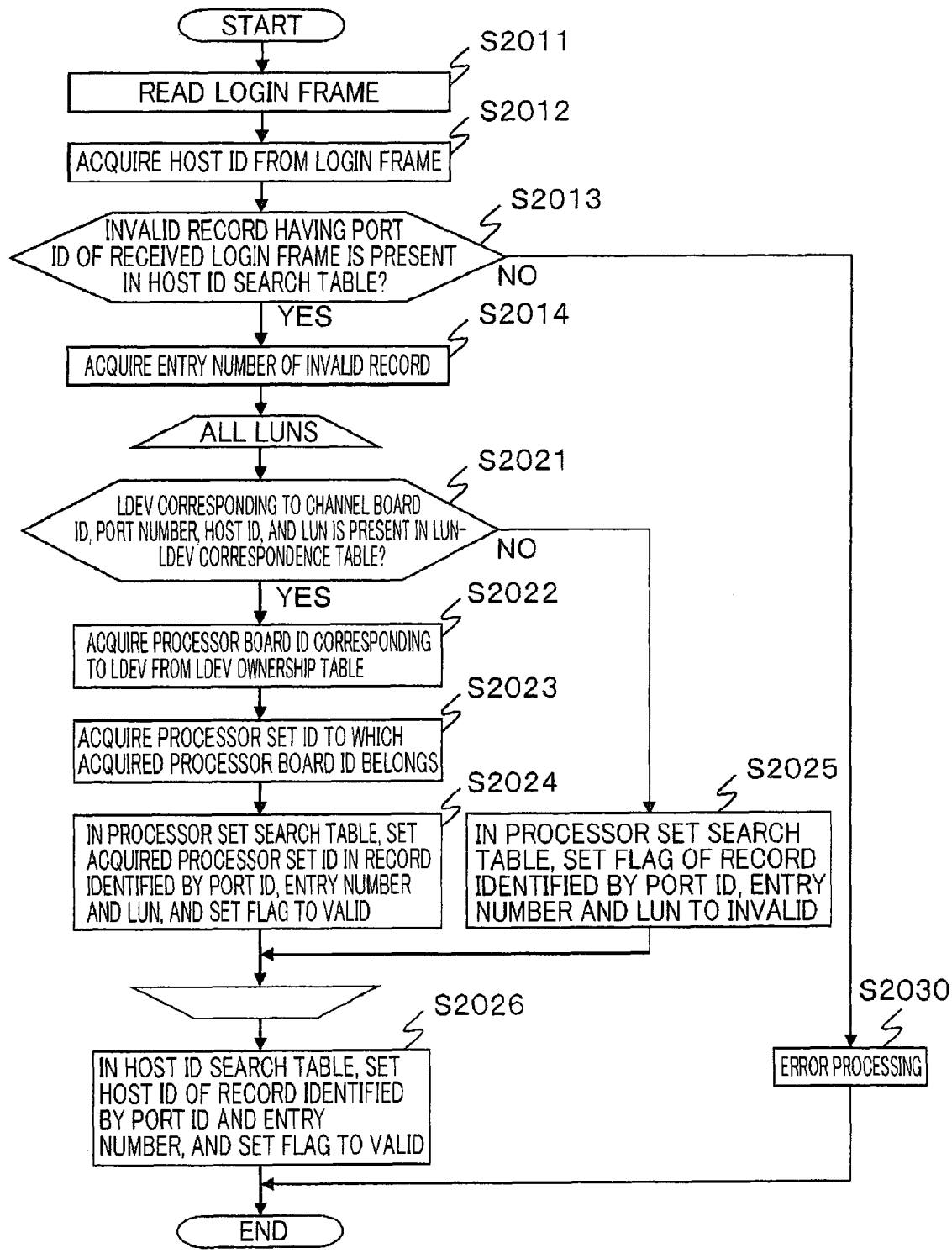

[Fig. 21]
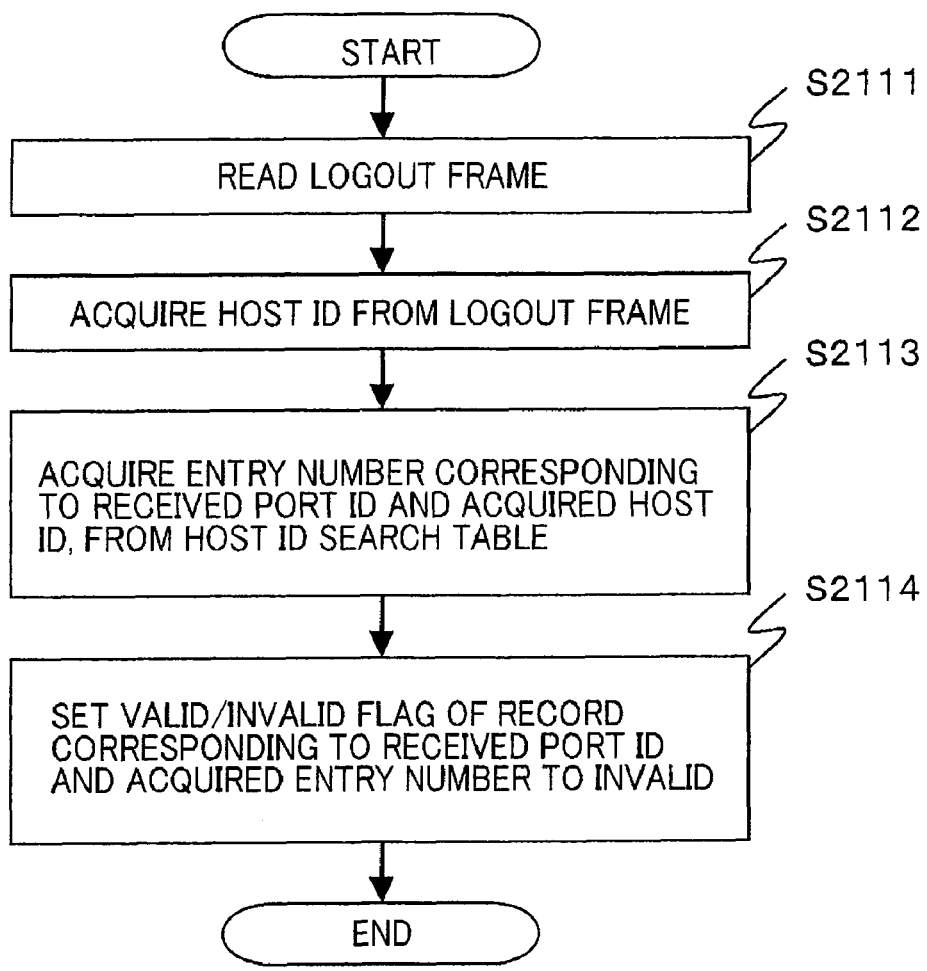

[Fig. 22]
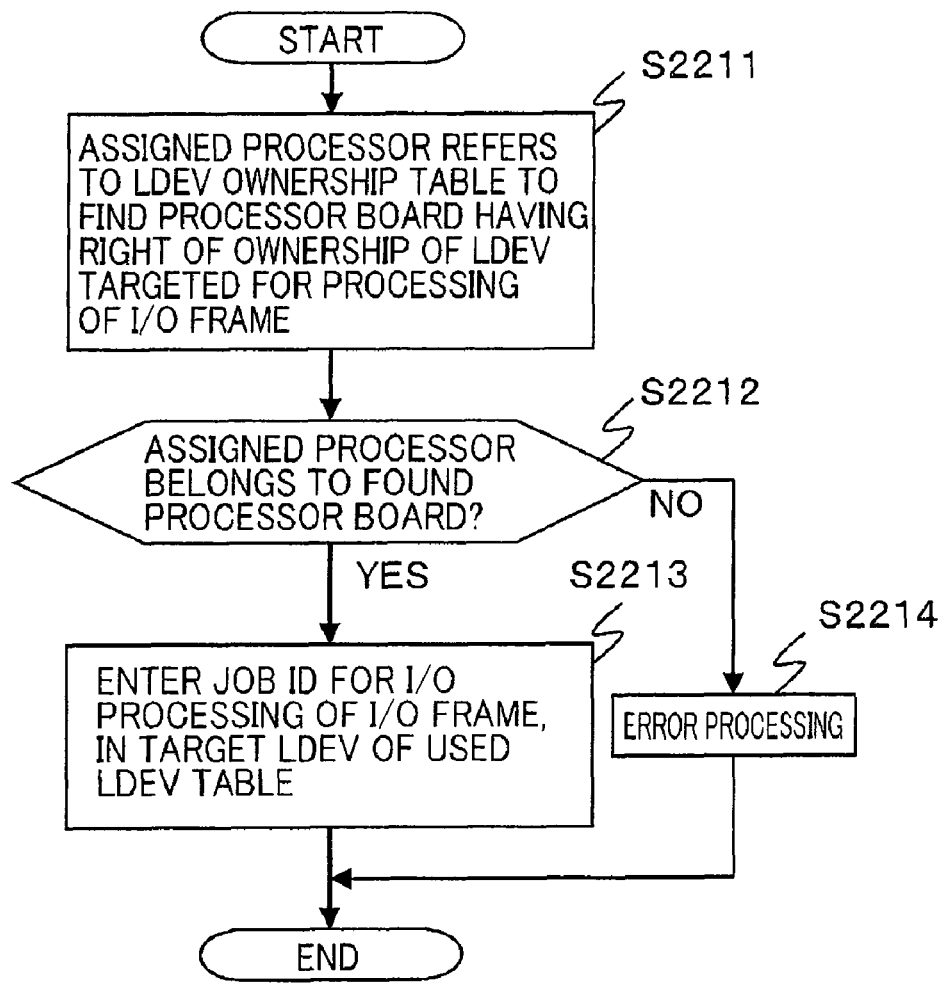
[Fig. 23]
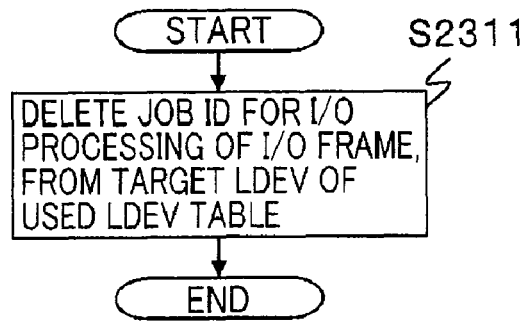

[Fig. 24]

USED LDEV TABLE 525

| LDE-IDV | JOB ID (PLURAL IDS MAY BE ENTERED) | | | |
|---|---|---|---|---|
| 0 | 1 | 5 | - | ... |
| 1 | 3 | 2 | 7 | ... |
| 2 | - | - | - | ... |
| ... | ... | ... | ... | ... |
| 65535 | 0 | - | - | ... |

2411  2412

STORAGE APPARATUS AND METHOD FOR CONTROLLING STORAGE APPARATUS

TECHNICAL FIELD

The present invention relates to a storage apparatus and a method for controlling the storage apparatus, and particularly relates to a technique for efficient and reliable handling of a data I/O request which the storage apparatus receives from an external apparatus.

BACKGROUND ART

PTL 1, for example, discloses a storage system including plural host adaptors, plural disk adaptors, a cache memory, a shared memory, and storage devices. In the storage system, the host adaptors control data transfer between a host apparatus and the cache memory, the disk adaptors control data transfer between the cache memory and the storage devices, the cache memory temporarily holds data received from the host apparatus or data read from the storage devices, and the shared memory is shared by the host adaptors and the disk adaptors.

CITATION LIST

Patent Literature

PTL 1: Japanese Patent Application Laid-open Publication No. 2005-018506

SUMMARY OF INVENTION

Technical Problem

In a storage apparatus having such a configuration as is mentioned above, IO processing loads are required to be appropriately distributed onto processors that form the host adaptors and the disk adaptors in order to prevent the I/O processing load from concentrating on a specific processor. Also, control information that is referred to by the host adaptors or the disk adaptors at the time of I/O processing is required to be appropriately arranged in consideration of the access performance of memories included in the host adaptors and the disk adaptors and the access performance of the shared memory.

The present invention has been made in view of such a background. An object of the present invention is to provide a storage apparatus and a method for controlling the storage apparatus, which are capable of efficient and reliable handling of a data I/O request which the storage apparatus receives from an external apparatus.

Solution to Problem

In order to attain the above object, one aspect of the present invention is a storage apparatus comprising:
at least one channel board that receives a data I/O request sent from an external apparatus;
at least one drive board that performs any one of the writing and reading of data to and from a storage device configured by including a plurality of storage drives, in response to the received data I/O request;
a cache memory that stores write data that is to be written to the storage device, or read data that is read from the storage device;
a plurality of processor boards that transfer data between any two of the channel board, the drive board, and the cache memory; and
a shared memory accessible from the processor boards,
wherein the processor boards each include a microprocessor, and a local memory whose accessibility from the microprocessor is higher than the shared memory, the storage device provides a storage area of the storage drives in units of an LDEV being a logical storage area,
the channel board stores a frame transfer table containing information indicative of correspondence between the LDEV and each of the processor boards, the correspondence set in accordance with a right of ownership that is a right of access to the LDEV set for each of the processor boards,
each of the processor boards stores LDEV control information in the local memory, the LDEV control information being information to be referred to by the processor board at the time of access to the LDEV for which the processor board has the right of ownership,
the channel board transfers a data frame that forms the received data I/O request, to one of the processor boards corresponding to the LDEV specified from the information contained in the data frame in the frame transfer table.

According to the present invention, the channel board transfers the data frame that forms the data I/O request received from the external apparatus, to the processor board, in accordance with the frame transfer table set in accordance with the right of ownership of the LDEV set to each of the processor boards. This enables the reliable transfer of the data frame to the processor board having the LDEV control information required for the execution of the processing of the data frame. This enables arrangement of the LDEV control information in the local memory of each processor board whose accessibility from the microprocessor is higher than the shared memory, and thus enables the microprocessor of the processor board to process the data frame at high speed by utilizing the LDEV control information in the local memory. Therefore, this enables an improvement in processing performance of the storage apparatus.

Another aspect of the present invention is the storage apparatus, wherein the frame transfer table contains information indicative of correspondence between the LDEV and a processor set being a set of one or more of the microprocessor, as the information indicative of the correspondence between the LDEV and each of the processor boards, and
the channel board transfers a data frame that forms the received data I/O request, to the processor set of the processor boards having the processor set corresponding to the LDEV specified from the information contained in the data frame by referring to the frame transfer table.

According to the present invention, a target for data frame transfer can be determined in units of the processor set of the processor board. This enables appropriate control of the target for the frame transfer according to the configuration of the microprocessor or the local memory.

Still another aspect of the present invention is the storage apparatus, wherein
any one of the shared memory and the local memory stores an LDEV ownership table as information indicative of the right of ownership,
any one of the shared memory and the local memory stores a correspondence table indicative of correspondence among the channel board, a port and the LDEV, the port included in the channel board for communication with the external apparatus, and
when a login frame as a data frame for the external apparatus to log in to the storage apparatus is received from the external apparatus, the channel board specifies, by using the correspondence table, the processor board having the right of ownership of the LDEV corresponding to the channel board and a port number of the port of the received login frame, thereby acquires correspondence between the LDEV and the processor board, and sets the acquired correspondence in the frame transfer table.

As mentioned above, the setup of the frame transfer table can be accomplished with efficiency and reliability, based on the port number and the channel board that has received the login frame. Also, the setup of the frame transfer table can be done at a time, when the external apparatus logs in to the storage apparatus, as mentioned above. The setup of the frame transfer table is done at once at the time of login as mentioned above, thereby enabling efficient handling of the frame coming in from the external apparatus during the login period.

A further aspect of the present invention is the storage apparatus, wherein when one of the processor boards receives a logout frame from the external apparatus, as a data frame for the external apparatus to log out of the storage apparatus, the processor board nullifies the correspondence between the LDEV and the processor board for the external apparatus that has sent the logout frame, in the frame transfer table.

As mentioned above, when the external apparatus logs out of the storage apparatus, the information on the external computer is made invalid in the frame transfer table. This enables preventing unnecessary information from remaining in the frame transfer table, and thus enables effective use of storage resources of the channel board.

A further aspect of the present invention is the storage apparatus, further comprising an LDEV ownership manager, wherein the storage apparatus is communicatively coupled to a management computer capable of accessing the shared memory, and the LDEV ownership table is configurable by the management apparatus, the storage apparatus stores a used LDEV table in which, for each of the LDEVs, information indicating whether or not a job based on the data I/O request for the LDEV is being executed, and the LDEV ownership manager inhibits a change in setting of the ownership for the LDEV, if information indicating that the job for the LDEV is being executed is set in the used LDEV table.

The inhibition of the changing the right of ownership for the LDEV during the execution of the job, as mentioned above, enables reliable prevention of a stop or runaway of the microprocessor. Such trouble may occur in such a situation where the careless change of the right of ownership is made during the execution of the job, which leads to a mismatch in the LDEV control information or to destruction of the contents of a register or target data.

A further aspect of the present invention is the storage apparatus, wherein each of the processor boards stores load information on the microprocessors in the shared memory, when necessary, and the LDEV ownership table is set by the management apparatus so that the loads on the microprocessors become uniform.

Appropriate setting of the LDEV ownership table according to the load condition of each microprocessor, as mentioned above, enables achieving easy and effective distribution of loads between the microprocessors.

A further aspect of the present invention is the storage apparatus, wherein each of the processor board monitors load information on the processor sets, and sets the correspondence between the LDEV and the processor set in the frame transfer table so that the loads on the processor sets becomes uniform.

Appropriate setup of the frame transfer table according to the load condition of each processor set, as mentioned above, enables achieving load distribution between the microprocessors.

Incidentally, the LDEV control information is at least any one of information on exclusive control of the LDEV from the microprocessor, information indicative of the presence or absence of a reserve request from the external apparatus to the LDEV, and information that identifies the external apparatus that has issued the reserve request.

Other problems disclosed in the specification of the present application and methods for solving the problems will be apparent from the following section "Description of Embodiments" and the accompanying drawings.

Advantageous Effects of Invention

According to the present invention, efficient and reliable handling of a data I/O request which a storage apparatus receives from an external apparatus can be achieved.

BRIEF DESCRIPTION OF DRAWINGS

FIG. 1 is a diagram showing a configuration of a storage system 1.

FIG. 2A is a diagram showing a hardware configuration of a channel board 11.

FIG. 2B is a diagram showing a hardware configuration of a processor board 12.

FIG. 2C is a diagram showing a hardware configuration of a drive board 13.

FIG. 3 is a diagram showing an example of a hardware configuration of a computer (or an information processing apparatus) available for use as a management apparatus 3.

FIG. 4 is a diagram showing a main function included in the management apparatus 3.

FIG. 5 is a diagram showing main functions and main data included in a storage apparatus 10.

FIG. 6 is a flowchart for explaining a data write process S600.

FIG. 7 is a flowchart for explaining a data read process S700.

FIG. 8 is a schematic illustration for explaining a configuration at a frame level in the channel board 11.

FIG. 9 is a schematic illustration for explaining a configuration at a frame level of the processor board 12.

FIG. 10A is a diagram showing an example of a connection configuration of microprocessors 1221, processor sets 1230, L2, and PM.

FIG. 10B is a diagram showing an example of a connection configuration of microprocessors 1221, processor sets 1230, L2, and PM.

FIG. 10C is a diagram showing an example of a connection configuration of microprocessors 1221, a processor set 1230, L2, and PM.

FIG. 11A is a diagram showing an example of a format of a frame sent from a host apparatus 2 to the storage apparatus 10.

FIG. 11B is a diagram showing an example of a format of a frame (or a data write request) sent from the host apparatus 2 to the storage apparatus 10.

FIG. 11C is a diagram showing an example of a format of a frame (or a data read request) sent from the host apparatus 2 to the storage apparatus 10.

FIG. 12 is a table showing an example of a frame transfer table 521.

FIG. 13 is a flowchart for explaining an I/O frame transfer process S1300.

FIG. 14 is a table showing an example of a LUN-LDEV correspondence table 522.

FIG. 15 is a table showing an example of an LDEV ownership table 523.

FIG. 16 is a schematic illustration for explaining a storage location of the LDEV ownership table 523 and a management method for the LDEV ownership table 523.

FIG. 17 is a schematic illustration for explaining a storage location of LDEV control information 524 and a management method for the LDEV control information 524.

FIG. 18 is a flowchart for explaining a front end process S1800.

FIG. 19 is a flowchart for explaining an authentication frame transfer process S1812.

FIG. 20 is a flowchart for explaining details of a frame transfer table setting process S1814 at the time of host login.

FIG. 21 is a flowchart for explaining details of a frame transfer table setting process S1834 at the time of host logout.

FIG. 22 is a flowchart for explaining details of an LDEV reserve process S1824.

FIG. 23 is a flowchart for explaining details of an LDEV release process S1826.

FIG. 24 is a table showing an example of a used LDEV table 525.

DESCRIPTION OF EMBODIMENTS

An embodiment of the present invention will be described below. FIG. 1 shows a configuration of a storage system 1 as described by way of the embodiment. As shown in FIG. 1, the storage system 1 is configured by including a host apparatus 2 (or an external apparatus), a storage apparatus 10 that communicates with the host apparatus 2 via a communication network 5, and a management apparatus 3 coupled communicatively to the storage apparatus 10 via a LAN (Local Area Network) or the like.

The communication network 5 is, for example, a LAN, a SAN (Storage Area Network), the Internet, a public communication network, or the like. Communication between the host apparatus 2 and the storage apparatus 10 is performed according to a protocol such as TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark).

The host apparatus 2 is an information processing apparatus (or a computer) that utilizes a storage area provided by the storage apparatus 10. Hardware such as a personal computer, a mainframe, or an office computer, for example, is used to configure the host apparatus 2. When accessing the above-mentioned storage area, the host apparatus 2 sends a data I/O request to the storage apparatus 10.

The storage apparatus 10 includes at least one channel board 11, at least one processor board 12 (or microprocessor), at least one drive board 13, a cache memory 14, a shared memory 15, an internal switch 16, a storage device 17, and a service processor 18. Of these, the channel board 11, the processor board 12, the drive board 13, the cache memory 14, and the shared memory 15 are communicatively coupled to one another via the internal switch 16.

The channel board 11 accepts the data 110 request (such as a data write request or a data read request) sent from the host apparatus 2, and sends a response of processing to the accepted data 110 request (for example, read data, read completion information, or write completion information) back to the host apparatus 2. The channel board 11 has a function involving protocol control for communication with the host apparatus 2.

The processor board 12 performs processing involving data transfer from one to another of the channel board 11, the drive board 13, and the cache memory 14, in response to the above-mentioned data I/O request received by the channel board 11. The processor board 12 performs the delivery of data (i.e., data read from the storage device 17 or data to be written to the storage device 17) between the channel board 11 and the drive board 13 via the cache memory 14, for example. The processor board 12 also subjects data stored in the cache memory 14 to staging (i.e., the reading of data from the storage device 17) or destaging (i.e., the writing of data to the storage device 17).

RAM (Random Access Memory) capable of quick access, for example, is used to configure the cache memory 14. The cache memory 14 stores the data to be written to the storage device 17 (hereinafter called "write data") and the data read from the storage device 17 (hereinafter referred to as "read data"). The shared memory 15 stores various kinds of information for use in control of the storage apparatus 10.

The drive board 13 establishes communication with the storage device 17 at the time of the reading of data from the storage device 17 or the writing of data to the storage device 17. A high-speed crossbar switch, for example, is used to configure the internal switch 16. Communication through the internal switch 16 occurs, for example, according to Fibre Channel, iSCSI, TCP/IP or other protocols.

The storage device 17 is configured by including plural storage media (such as hard disk drives or semiconductor memories (or SSDs (Solid-State Drives))). The storage device 17 will be hereinafter described as being configured using, for example, the hard disk drives of SAS (Serial Attached SCSI), SATA (Serial ATA), FC (Fibre Channel), PATA (Parallel ATA), SCSI or other type or the semiconductor memories (or the SSDs) (hereinafter, the storage media such as the hard disk drives or the semiconductor memories will be generically called "storage drives 171").

The storage device 17 provides a storage area in which a logical device (or LDEV 172) is a unit. The logical unit is configured using a storage area (for example, a storage area belonging to a RAID group (or a parity group)) provided by the storage drives 171 being controlled by RAID (Redundant Array of Inexpensive (or Independent) Disks) or other control method. As will be described later, the storage apparatus 10 provides a logical storage area (hereinafter called "LU (Logical Unit)") configured using the LDEV 172, to the host apparatus 2.

FIG. 2A shows a hardware configuration of the channel board 11. The channel board 11 includes an external communication interface (hereinafter denoted as an external communication I/F 111) having a port (or a communication port) for communication with the host apparatus 2, a processor 112 (including a frame processing chip and a frame transfer chip to be described later), a memory 113, an internal communication interface (hereinafter denoted as an internal communication I/F 114) having a port (or a communication port) for communication with the processor board 12.

A NIC (Network Interface Card) or an HBA (Host Bus Adaptor), for example, is used to configure the external communication I/F 111. A CPU (Central Processing Unit) or an MPU (Micro Processing Unit), for example, is used to configure the processor 112. The memory 113 is RAM (Random Access Memory) or ROM (Read Only Memory). The internal communication I/F 114 establishes communications with the processor board 12, the drive board 13, the cache memory 14, and the shared memory 15, through the internal switch 16.

FIG. 2B shows a hardware configuration of the processor board 12. The processor board 12 includes an internal communication interface (hereinafter denoted as an internal communication I/F 121), a processor 122, and a memory 123 (or a local memory) being more accessible (or capable of quicker access) from the processor 122 as compared to the shared memory 15. The internal communication I/F 121 establishes communications with the channel board 11, the drive board 13, the cache memory 14, and the shared memory 15, through the internal switch 16. The processor 122 is a CPU, an MPU, or a DMA (Direct Memory Access) controller, for example. The memory 123 is RAM or ROM. Incidentally, the processor 122 is accessible to both the memory 123 and the shared memory 15; however, the memory 123 has a higher access speed as viewed from the processor 122 (or more accessible) than the shared memory 15, and thus, the memory 123 is lower in access cost than the shared memory 15.

FIG. 2C shows a hardware configuration of the drive board 13. The drive board 13 includes an internal communication interface (hereinafter denoted as an internal communication I/F 131), a processor 132, a memory 133, and a drive interface (hereinafter denoted as a drive I/F 134). The internal communication I/F 131 establishes communication with the channel board 11, the processor board 12, the cache memory 14, and the shared memory 15, through the internal switch 16. The processor 132 is a CPU or an MPU, for example. The memory 133 is RAM or ROM, for example. The drive I/F 134 establishes communication with the storage device 17.

The service processor 18 (SVP) shown in FIG. 1 is a computer including a CPU and a memory. The service processor 18 controls components of the storage apparatus 10 and monitors the components for their status conditions. The service processor 18 establishes communication with the components of the storage apparatus 10 such as the channel board 11, the processor board 12, the drive board 13, the cache memory 14, the shared memory 15, and the internal switch 16, through the internal switch 16 or through a communication means such as a LAN. The service processor 18 acquires performance information or the like from the components of the storage apparatus 10 as needed, and provides the information to the management apparatus 3. The service processor 18 performs setting, control and maintenance (e.g., installs or updates software) for the components, and does the like, in accordance with information sent from the management apparatus 3.

FIG. 3 shows an example of a computer (or an information processing apparatus) available for use as the management apparatus 3. As shown in FIG. 3, a computer 30 includes a CPU 31, volatile or nonvolatile memory 32 (RAM or ROM), a storage device 33 (for example, a hard disk drive or semiconductor memory (SSD)), an input device 34 such as a keyboard or a mouse, an output device 35 such as a liquid crystal display monitor or printer, and a communication interface (denoted as a communication I/F 36) such as a NIC or an HBA. The management apparatus 3 is a personal computer or an office computer, for example. The management apparatus 3 may be integral with the storage apparatus 10 (or may be mounted on the same chassis as that for the storage apparatus 10). The management apparatus 3 is communicatively coupled to the service processor 18 via the LAN or the like. The management apparatus 3 includes a user interface using a GUI (Graphical User Interface), a CLI (Command Line Interface), or the like, for control or monitoring of the storage apparatus 10.

Functions of the Management Apparatus

FIG. 4 shows a main function of the management apparatus 3. As shown in FIG. 5, the management apparatus 3 includes an LDEV manager 411 which performs setting or control involving an LDEV ownership table 523 to be described later. Incidentally, the function included in the management apparatus 3 is implemented by hardware of the management apparatus 3, or by a program stored in the memory 32 being loaded and executed by the CPU 31 of the management apparatus 3.

Functions of Storage Apparatus

FIG. 5 shows the main functions included in the storage apparatus 10, and main data managed in the storage apparatus 10. As shown in FIG. 5, the storage apparatus 10 includes a host login processor 511, a host logout processor 512, an LDEV ownership manager 513, and an I/O processor 514. Incidentally, the above-mentioned functions included in the storage apparatus 10 are implemented by hardware included in the channel board 11, the processor board 12, or the drive board 13 of the storage apparatus 10, or by a program stored in the memory 113, 123, 133 or shared memory 15 being loaded and executed by the processor 112, 122 or 132.

The host login processor 511 executes processing involving the login of the host apparatus 2 to the storage apparatus 10. The host logout processor 512 executes processing involving the logout of the host apparatus 2 from the storage apparatus 10. The LDEV ownership manager 513 manages the LDEV ownership table 523 and LDEV control information 524.

The I/O processor 514 performs processing involving a data I/O request (a data write request or a data read request) sent from the host apparatus 2. For example, upon receipt of the data write request as the data I/O request from the host apparatus 2, the I/O processor 514 of the storage apparatus 10 generates a write request (hereinafter referred to as a "drive write request (or storage medium write request)") to the storage drive 171 for the received data I/O request, and enqueues the drive write request into a write process queue of the drive board 13. The drive board 13 acquires the drive write requests one after another from the write process queue, and writes data to the storage device 17 according to the acquired drive write request. Also, upon receipt of the data read request as the data I/O request from the host apparatus 2, the I/O processor 514 reads data from the storage device 17, and sends the data read from the storage device 17 (or the read data) to the host apparatus 2.

As shown in FIG. 5, the storage apparatus 10 manages (or stores) a frame transfer table 521, a LUN-LDEV correspondence table 522, the LDEV ownership table 523, the LDEV control information 524, and a used LDEV table 525. Of these, the frame transfer table 521 is stored in the memory 113 of the channel board 11. The LUN-LDEV correspondence table 522 is stored in the shared memory 15 or the memory 123 of the processor board 12. The LDEV ownership table 523 is stored in the shared memory 15 or the memory 123 of the processor board 12. The LDEV control information 524 is stored in the shared memory 15 or the memory 123 of the processor board 12. The used LDEV table 525 is stored in the shared memory 15. The channel board 11 and the processor board 12 are accessible to any table of the shared memory 15, unless there is no access restriction. Also, the processor board 12 is accessible to the frame transfer table 521 stored in the memory 113 of the channel board 11.

Description will now be given with regard to a basic function performed by the storage apparatus 10.

Writing of Data

FIG. 6 is a flowchart for explaining an I/O process (hereinafter referred to as a "data write process S600") which the I/O processor 514 performs when the storage apparatus 10 receives the data write request as the above-mentioned data I/O request from the host apparatus 2. The data write process S600 will be described below in connection with FIG. 6.

The data write request sent from the host apparatus 2 is received by the channel board 11 of the storage apparatus 10 (S611, S612). Upon receipt of the data write request from the host apparatus 2, the channel board 11 sends notification of the receipt of the data write request to the processor board 12 and the drive board 13 (S613). The channel board 11 sends completion information to the host apparatus 2 (S614), and the host apparatus 2 receives the incoming completion information (S615).

Upon receipt of the above-mentioned notification from the channel board 11 (S621), the processor board 12 generates the drive write request based on the data write request and stores the drive write request in the cache memory 14, and also sends the generated drive write request to the drive board 13 (S622, S623).

Upon receipt of the drive write request, the drive board 13 enqueues the drive write request into the write process queue (S624). The drive board 13 reads the drive write request from the write process queue as needed (S625). Then, the drive board 13 reads drive write data specified by the read-out drive write request from the cache memory 14, and writes the read-out drive write data to the storage drive 171 (S626).

Then, the drive board 13 sends, to the processor board 12, a report (or a completion report) that the writing of the drive write data for the drive write request has been completed (S627). The processor board 12 receives the incoming completion report (S628).

Data Read Process

FIG. 7 is a flowchart for explaining an I/O process (hereinafter referred to as a "data read process S700") which the read processor 612 of the storage apparatus 10 performs when the storage apparatus 10 receives the data read request as the above-mentioned data I/O request from the host apparatus 2. The data read process S700 will be described below in connection with FIG. 7.

The data read request sent from the host apparatus 2 is received by the channel board 11 of the storage apparatus 10 (S711, S712). Upon receipt of the data read request from the host apparatus 2, the channel board 11 sends notification of the receipt of the data read request to the processor board 12 and the drive board 13 (S713).

Upon receipt of the above-mentioned notification from the channel board 11, the drive board 13 reads data specified by the data read request (for example, data specified by LBA (Logical Block Address)) from the storage device 17 (or the storage drive 171) (S714). Incidentally, if read data is present in the cache memory 14 (or if there is a cache hit), the reading of the data from the storage device 17 (S714) is omitted. The processor board 12 writes the data read by the drive board 13 to the cache memory 14 (S715). The processor board 12 transfers the data written to the cache memory 14 to the communication I/F at any time (S716).

The channel board 11 sends the read data sent from the processor board 12, one after another, to the host apparatus 2 (S717, S718). Upon completion of the transmission of the read data, the channel board 11 sends a completion report to the host apparatus 2 (S719). The host apparatus 2 receives the incoming completion report (S720).

Configuration of Frame Level

Description will now be given with regard to the configuration of a data frame level (hereinafter abbreviated as a frame) in the above described storage system 1. The frame as employed herein refers to the frame that forms the data I/O request sent from the host apparatus 2 to the storage apparatus 10. An example of the frame is an FC frame based on Fibre Channel.

Channel Board

FIG. 8 shows a schematic illustration for explaining the configuration at the frame level in the channel board 11. As shown in FIG. 8, the channel board 11 includes ports 1151 that receive frames sent from the host apparatus 2, a frame processing chip 1121 and a frame transfer chip 1122 as the components of the processor 112 mentioned previously, the previously mentioned memory 113, and a port 1152 which is used in communication with the processor board 12. As shown in FIG. 8, the memory 113 is provided with a frame transmission/reception queue 1131 for frame transfer (or transmission and reception) between the frame processing chip 1121 and the frame transfer chip 1122. The frame transmission/reception queue 1131 is provided for example for each of the ports 1151 of the channel board. Also, the memory 113 stores the frame transfer table 521 mentioned previously.

Processor Board

FIG. 9 is a schematic illustration for explaining the configuration at the frame level in the processor board 12. As shown in FIG. 9, the processor board 12 includes plural microprocessors 1221 (indicated by MP in FIG. 9) as the components of the processor 122 mentioned previously, and the memory 123 mentioned previously. Each microprocessor is associated with a core processor of a multicore processor, for example.

The memory 123 is provided with a frame transmission/reception queue 1231 for frame transfer (or transmission and reception) between the channel board 11 and the microprocessors 1221. The frame transmission/reception queue 1231 is provided for example for each of the ports 1152 of the channel board. Also, the memory 123 stores the LDEV control information 524 and the LDEV ownership table 523 mentioned previously.

As shown in FIG. 9, each microprocessor 1221 belongs to any of one or more processor sets 1230. Each processor set 1230 is set as a group of the microprocessors 1221 that share the same frame transmission/reception queue 1231. The processor sets 1230 are set, for example, according to an increase in the number of cores of the CPU or a change in a cache structure of the CPU.

FIGS. 10A to 10C show examples of configuration of the microprocessors 1221, the processor sets 1230, L2, and PM. In FIGS. 10A to 10C, each L2 corresponds to an internal memory (or an L2 cache) of the CPU, and each PM corresponds to the memory 123 (or the local memory) mentioned previously.

In a form shown in FIG. 10A, two microprocessors 1221 belong to each processor set 1230. Data transfer between the microprocessors 1221 belonging to the same processor set 1230 is performed through the L2, whereas data transfer between the microprocessors 1221 belonging to different processor sets 1230 is performed through the PM. Each processor set 1230 is associated with the frame transmission/reception queue 1231 of all ports 1151 of all channel boards 11 in the storage apparatus 10.

As shown in FIG. 10A, in the PM, storage areas (hereinafter denoted as LM) which are each accessible only from a given microprocessor 1221 and which do not require exclusive control are provided. The microprocessors 1221 each can utilize the LM provided for each microprocessor. This configuration enables load distribution between the microprocessors 1221 belonging to the same processor set 1230. Also, quick data transfer between the microprocessors 1221 belonging to the same processor set 1230 can be performed through the L2.

In FIG. 10B, one microprocessor 1221 belongs to each processor set 1230. Data transfer between the microprocessors 1221 belonging to different processor sets 1230 is performed through the L2 or the PM. In this form, each processor set 1230 is associated with the frame transmission/reception queue 1231 of all ports 1152 of all channel boards 11 in the storage apparatus 10. The microprocessors 1221 each can utilize the LM provided in the PM for each microprocessor 1221.

In FIG. 10C, all microprocessors 1221 belong to one processor set 1230, and data transfer between the microprocessors 1221 is performed through the L2 or the PM. In this form, the processor set 1230 is associated with the frame transmission/reception queue 1231 of all ports 1152 of all channel boards 11 in the storage apparatus 10. The microprocessors 1221 each can utilize the LM provided in the PM for each microprocessor 1221.

Frame Structure

FIG. 11A shows a format of a frame which the host apparatus 2 sends to the storage apparatus 10 (or the channel board 11 receives). The frame format contains a host ID 1111 in which a host ID is set as information identifying the host apparatus 2 that has send the frame, and a frame type 1112 in which a frame type is set as information indicative of the type of the frame. Incidentally, in the case of the FC frame, the host ID is "S_ID."

In the frame type 1112, for example, "Login" is set for the frame for login to the storage apparatus 10, "Logout" is set for the frame for logout, "Write" is set for the frame for the data write request, or "Read" is set for the frame involved in the data read request.

FIG. 11B shows the frame format for the data write request (or when the frame type 1112 is "Write"). The frame contains information such as LUN 1113, an address 1114 and write data 1115, in addition to the host ID 1111 and the frame type 1112. Among the information, the LUN 1113 includes LUN which is information that identifies a write target LU. The address 1114 includes the write target address (for example, LBA) of the writing target in the LU. The write data 1115 includes write data.

FIG. 11C shows the frame format for the data read request (or when the frame type 1112 is "Read"). As shown in FIG. 11C, the frame contains information such as LUN 1117, an address 1118 and a data length 1119, in addition to the host ID 1111 and the frame type 1112. Among the information, the LUN 1117 includes LUN (Logical Unit Number) which is information that identifies a read target LU. The address 1118 includes the read target address (for example, LBA) in the target LU. The data length 1119 includes the data length of read data.

Hereinafter, the frame in which "Login" or "Logout" is set in the frame type will be called an authentication frame, and the frame in which "Write" or "Read" is set in the frame type will be called an I/O frame.

Frame Transfer Table

FIG. 12 shows an example of the frame transfer table 521 stored in the memory 113 of the channel board 11. As shown in FIG. 12, the frame transfer table 521 contains two tables: a host ID search table 5211 and a processor set search table 5212.

As shown in FIG. 12, the host ID search table 5211 is configured of plural records each including items of: a port ID 1211 in which a port ID that identifies the port 1151 of the channel board 11 is set, an entry number 1212 in which an entry number is set as a number assigned automatically, for each port, to each frame received by the corresponding port 1151, a valid/invalid flag 1213 in which information indicating whether the record is valid or invalid is set, and a host ID 1214 in which an identifier of the host apparatus 2 (for example, "S_ID" in the case of the FC frame) is set.

On the other hand, the processor set search table 5212 is configured of plural records each including items of: a port ID 1221 in which a port ID that identifies the port 1151 of the channel board 11 is set, an entry number 1222 in which an entry number is set, LUN 1223 in which LUN is set, a valid/invalid flag 1224 in which information indicating whether the record is valid or invalid is set, and a processor set ID 1225 in which a processor set ID is set as information that identifies the processor set 1230.

Transfer of I/O Frame

The frame transfer table 521 is referred to, when the channel board 11 receives the I/O frame from the host apparatus 2 and specifies the processor set 1230 to which the received I/O frame is to be transferred. FIG. 13 is a flowchart useful in explaining an I/O frame transfer process (hereinafter called an I/O frame transfer process S1300) performed by the channel board 11. The I/O frame transfer process S1300 will be described below in connection with FIG. 13. Incidentally, in the following description, the character "S" preceding the reference numeral refers to a step.

Upon receipt of the I/O frame from the host apparatus 2 (YES at S1311), the frame processing chip 1121 of the channel board 11 enqueues the I/O frame into the frame transmission/reception queue 1131 corresponding to the port 1151 that has received the I/O frame (at S1312). The frame transfer chip 1122 of the channel board 11 reads the I/O frame enqueued in the frame transmission/reception queue 1131 (at S1313), and acquires the host ID and the LUN contained in the I/O frame (at S1314).

Then, the frame transfer chip 1122 searches the host ID search table 5211, by using the port ID of the port 1151 that has received the I/O frame and the acquired host ID as a search key, thereby to acquire the entry number corresponding to the search key (at S1315). Then, the frame transfer chip 1122 searches the processor set search table 5212, by using the port ID of the port 1151 that has received the I/O frame, the entry number acquired at S1315 and the LUN acquired at S1314 as a search key, thereby to acquire the processor set ID corresponding to the search key (at S 1316). Then, the frame transfer chip 1122 transfers the I/O frame to the frame transmission/reception queue 1231 of the processor set 1230 identified by the channel board ID of the channel board 11 that has received the I/O frame, the port ID that identifies the port 1151, and the acquired processor set ID (at S1317).

LUN-LDEV Correspondence Table

FIG. 14 shows an example of the LUN-LDEV correspondence table 522 mentioned previously. The LUN-LDEV correspondence table 522 is the table that is referred to at the time of updating of the contents of the frame transfer table 521. The contents of the LUN-LDEV correspondence table 522 are appropriately updated by the management apparatus 3.

As shown in FIG. 14, the LUN-LDEV correspondence table 522 is configured of plural records each including items of: a channel board ID 1411 in which a channel board ID is set as information that identifies the channel board 11, a port ID 1412 in which the above-mentioned port ID (or the information that identifies the port 1151 that receives the frame sent from the host apparatus 2) is set, an entry number 1413 in which the above-mentioned entry number is set, LUN 1414 in which LUN is set, and LDEV-ID 1415 in which LDEV-ID is set as information that identifies the LDEV 172.

Right of Ownership of LDEV

The management apparatus 3 manages a right of access to the LDEV 172 (hereinafter called a right of ownership), which is set for each of the processor boards 12 included in the storage apparatus 10. The range of the LDEV 172 accessible by each processor board 12 is limited by the right of ownership. Each processor board 12 cannot access the LDEV 172 for which the processor board 12 does not have the right of ownership. The right of ownership is set for example for the purpose of avoiding concentration of load on a given processor board 12.

The contents of setting of the right of ownership are managed in the LDEV ownership table 523 mentioned previously. A master of the LDEV ownership table 523 is stored in the shared memory 15 of the storage apparatus 10. FIG. 15 shows an example of the LDEV ownership table 523. As shown in FIG. 15, the LDEV ownership table 523 has set therein LDEV-ID 1511 in which LDEV-ID is set, and a processor board ID 1512 as information that identifies the processor board 12 having the right of ownership for the LDEV-ID.

A user interface provided by the LDEV manager 411 of the management apparatus 3 can be utilized to set the contents of the LDEV ownership table 523. The setting of the LDEV ownership table 523 is appropriately done for example at the time of initial installation or maintenance of the storage apparatus 10.

FIG. 16 is an illustration for explaining a storage location of the LDEV ownership table 523 and a management method for the LDEV ownership table 523. As shown in FIG. 16, the LDEV ownership table 523 is such that its master data is stored in the shared memory 15 of the storage apparatus 10, and its replicated data is stored in the memory 123 of each processor board 12 (i.e., a storage area that can be referred to by each microprocessor 1221, as is the case with the PM shown in FIGS. 10A to 10C). When the setting of the right of ownership is made by using the management apparatus 3, the setting is made on the master LDEV ownership table 523 stored in the shared memory 15. The contents of the master LDEV ownership table 523 are actively or passively replicated (reflected) in the memory 123 of each processor board, as needed.

LDEV Control Information

The LDEV control information is the information that is referred to by the microprocessor 1221 of the processor board 12 at the time of access to the LDEV 172. The LDEV control information is, for example, information on exclusive control on access from the microprocessor 1221 to the LDEV 172, information indicating the presence or absence of a reserve request from the host apparatus 2 to the LDEV 172, or information (for example, a logical I/O path identifier or the like) that identifies the host apparatus 2 that has issued the reserve request.

FIG. 17 is an illustration useful in explaining a storage location of the LDEV control information 524 and a management method for the LDEV control information 524. As shown in FIG. 17, the LDEV control information 524 is stored in the shared memory 15 and the memory 123 (for example, the PM mentioned previously) of each processor board 12. Each processor board 12 typically stores only the LDEV control information 524 required for the processing of the 110 frame assigned to each processor board, while the shared memory 15 stores all the LDEV control information 524 stored in each processor board 12. Synchronization between the LDEV control information 524 in the shared memory 15 and the LDEV control information 524 stored in the memory 123 of each processor board 12 is provided for example by the processor 122 of each processor board 12. Also, the synchronization between the two pieces of the LDEV control information 524 is provided by the LDEV manager 411 of the management apparatus 3.

When the setting of the right of ownership is changed, the LDEV manager 411 of the management apparatus 3 duplicates the LDEV control information 524 required for the microprocessor 1221 of the processor board 12 to process the I/O frame, from the shared memory 15 into the memory 123 of the processor board 12 in which the right of ownership is newly set. As mentioned above, the microprocessor 1221 can process the I/O frame at high speed, since the LDEV control information 524 required for the microprocessor 1221 of the processor board 12 to process the I/O frame is stored in the memory 123 of each processor board 12.

Front-End Processing

FIG. 18 is a flowchart for explaining a general flow of processing that is performed at a front-end (or the channel board 11 and the processor board 12) during the duration between the instant when the host apparatus 2 logs in to the storage apparatus 10 and the instant when the host apparatus 2 logs out of the storage apparatus 10. The processing that is performed at the front-end (hereinafter called a front-end process S1800) will be described below in connection with FIG. 18.

First, the frame processing chip 1121 of the channel board 11 receives the authentication frame (hereinafter called a login frame) in which "Login" is set in the frame type, the authentication frame sent from the host apparatus 2 (at S1811). The frame transfer chip 1122 of the channel board 11 transfers the received login frame to the preset (or default) processor board 12 (at S1812). Details of this processing (hereinafter called an authentication frame transfer process S1812) will be described later.

Upon receipt of the login frame (at S1813), the processor board 12 performs the setting of the frame transfer table 521 (at S1814). Details of this processing (hereinafter called a frame transfer table setting process S1814) will be described later. Upon completion of the setting of the frame transfer table 521, the storage apparatus 10 starts receiving the I/O frame sent from the host apparatus 2.

Then, upon receipt of the I/O frame from the host apparatus 2 (at S1821), the frame transfer chip 1122 of the channel board 11 specifies the destination target processor set 1230 for the I/O frame by referring to the frame transfer table 521, and transfers the I/O frame to the specified processor set 1230. This I/O frame transfer process (S 1822) is the same as the above-mentioned processing performed at S1313 to S1317.

Upon receipt of the I/O frame (at S1823), the processor board 12 enters a job for execution of the processing of the I/O frame into the used LDEV table 525 (at S1824). Details of this processing (hereinafter called an LDEV reserve process S1824) will be described later.

Upon completion of the LDEV reserve process S 1824, the processor board 12 (or the microprocessor 1221 belonging to the processor set 1230 to which the I/O frame has been transferred) executes I/O processing for the I/O frame (i.e., the processing performed by the processor board 12, shown in FIGS. 6 and 7) (at S1825). For this I/O processing, the LDEV control information 524 stored in the memory 123 of the processor board 12 is appropriately referred to.

Upon completion of the I/O processing, the processor board 12 deletes the job entered at S1824 from the used LDEV table 525 (at S1826). Details of this processing (hereinafter called an LDEV release process S1826) will be described later. The processing from S1821 to S1826 is repeatedly performed, each time the I/O frame is received, during the duration until the host apparatus 2 logs out of the storage apparatus 10.

Then, when the frame processing chip 1121 of the channel board 11 receives the authentication frame (hereinafter called a logout frame) in which "Logout" is set in the frame type, the authentication frame sent from the host apparatus 2 (at S1831), the frame transfer chip 1122 of the channel board 11 transfers the received logout frame to the preset (or default) processor board 12 (at S1832). This processing is the same as the authentication frame transfer process S1812 mentioned previously.

Upon receipt of the logout frame (at S1833), the processor board 12 performs the setting of the frame transfer table 521 (at S1834). Details of this processing (hereinafter called a frame transfer table setting process S1834) will be described later.

Authentication Frame Transfer Process

FIG. 19 is a flowchart for explaining the details of the authentication frame transfer process S1812 (same in the case of S1832) shown in FIG. 18. The authentication frame transfer process S1812 will be described below in connection with FIG. 19.

First, the frame transfer chip 1122 of the channel board 11 reads the authentication frame (i.e., the login frame or the logout frame) from the frame transmission/reception queue 1131 (at S1911). Then, the frame transfer chip 1122 acquires a default processor set ID stored in the memory 113 of the channel board 11 or the shared memory 15 (at S1912). Note that, the default processor set ID is set by a user or an operator for example via the management apparatus 3, and is stored in the shared memory 15 or the memory 113, while being associated with the channel board ID and the port ID that identifies the port 1151 of the channel board 11.

Then, the frame transfer chip 1122 transfers the authentication frame to the frame transmission/reception queue 1231 of the processor set 1230 specified from the channel board ID of the channel board 11 that has received the authentication frame, the port ID that identifies the port 1151, and the acquired processor set ID (at S1913).

Frame Transfer Table Setting Process (At the Time of Login)

FIG. 20 is a flowchart for explaining the details of the frame transfer table setting process S1814 at the time of host login, shown in FIG. 18. The frame transfer table setting process S1814 will be described below in connection with FIG. 20.

First, the microprocessor 1221 (hereinafter called the assigned microprocessor 1221) of the processor board 12, to which the processing of the frame transmission/reception queue 1231 having the login frame enqueued therein is assigned, reads the login frame from the frame transmission/reception queue 1231 (at S2011), and acquires the host ID set in the login frame (at S2012).

Then, the assigned microprocessor 1221 accesses the frame transfer table 521 in the channel board 11 (hereinafter called the assigned channel board 11) that has transferred the login frame. Thereby, the assigned microprocessor 1221 searches the host ID search table 5211 of the frame transfer table 521, and checks whether or not records in which "invalid" is set in the valid/invalid flag 1213 are present in records having the port ID of the port 1151 (hereinafter called the receiving port 1151) that has received the login frame (at S2013). If the records are present (YES at S2013), one of the records is selected, and the processing goes to S2014.

At S2014, the assigned microprocessor 1221 acquires the entry number of the record selected at S2013 from the host ID search table 5211, and the processing goes to S2021. On the other hand, if the records are not present (NO at S2013), the processing goes to S2030. At S2030, the assigned microprocessor 1221 sends error notification to the assigned channel board 11. Upon receipt of the error notification, the assigned channel board 11 sends back a login error to the host apparatus 2. After that, the processing is brought to an end.

The processing from S2021 to S2025 is performed for each LUN associated with the assigned channel board 11 in the LUN-LDEV correspondence table 522. First, at S2021, the assigned microprocessor 1221 refers to the LUN-LDEV correspondence table 522 thereby to determine whether or not there is (or is recorded) an LDEV 172 corresponding to a combination of the channel board ID of the assigned channel board 11, the port ID of the receiving port 1151, the host ID acquired at S2012, and the LUN (hereinafter called the target LUN) being currently targeted for the processing (at S2021). If the LDEV 172 is present (or is recorded) (YES at S2021), the LDEV 172 is acquired, and the processing goes to S2022. If the LDEV 172 is not present (or is not recorded) (NO at S2021), the processing goes to S2025.

At S2022, the assigned microprocessor 1221 acquires the processor board 12 (or the processor ID) having the right of ownership of the acquired LDEV 172 from the LDEV ownership table 523, and acquires the processor set ID of any one of the processor sets 1230 belonging to the acquired processor board 12. Note that, the selection of the processor set 1230 may be accomplished according to a predetermined table or calculation equation, or for example according to the load condition of each of the processor sets 1230 belonging to the processor board 12.

Then, the assigned microprocessor 1221 sets the acquired processor set ID to the processor set ID 1225 of a record in the processor set search table 5212 of the assigned channel board 11, the record identified by the port ID of the receiving port 1151, the entry number acquired at S2014, and the target LUN (at S2024).

On the other hand, at S2025, the assigned microprocessor 1221 sets "invalid" in the valid/invalid flag 1224 of a record in the processor set search table 5212 of the assigned channel board 11, the record identified by the port ID of the receiving port 1151, the entry number acquired at S2014, and the target LUN.

At S2026, the assigned microprocessor 1221 sets the host ID acquired at S2012 to a record in the host ID search table 5211 of the assigned channel board 11, the record identified by the port ID of the receiving port 1151 and the entry number acquired at S2014. The micro processor also sets "valid" in the valid/invalid flag 1213 of the record.

As mentioned above, the setting of the frame transfer table 521 can be accomplished with efficiency and reliability, based on the port number of the channel board 11 that has received the login frame. Also, the setting of the frame transfer table 521 can be done all at once when the host apparatus 2 logs into the storage apparatus 10, as mentioned above. Since the setting of the frame transfer table 521 is done all at once at the time of login as mentioned above, the frame sent from the host apparatus 2 during the login period can be handled efficiently.

Frame Transfer Table Setting Process (At the Time of Logout)

FIG. 21 is a flowchart for explaining the details of the frame transfer table setting process S1834 at the time of host logout, shown in FIG. 18. The frame transfer table setting process S1834 will be described below in connection with FIG. 21.

First, the microprocessor 1221 (hereinafter called the assigned microprocessor 1221) of the processor board 12, to which the processing of the frame transmission/reception queue 1231 having the logout frame enqueued therein is assigned, reads the logout frame from the frame transmission/reception queue 1231 (at S2111), and acquires the host ID set in the logout frame (at S2112).

Then, the assigned microprocessor 1221 accesses the frame transfer table 521 in the channel board 11 (hereinafter called the assigned channel board 11) that has transferred the logout frame. Thereby the assigned microprocessor 1221 searches the host ID search table 5211 of the frame transfer table 521, and acquires the port ID of the port 1151 (hereinafter called the receiving port 1151) that has received the logout frame and the entry number set in the entry number 1212 of the record corresponding to the host ID acquired at S2112 (at S2113).

Then, the assigned microprocessor 1221 accesses the frame transfer table 521 of the assigned channel board 11 thereby to set "invalid" in the valid/invalid flag 1224 of the record corresponding to the port ID of the receiving port 1151 and the entry number acquired at S2113, in the processor set search table 5212 of the frame transfer table 521.

As mentioned above, when the host apparatus 2 logs out of the storage apparatus 10, the information on the host apparatus 2 is made invalid in the frame transfer table 521. This enables preventing unnecessary information from remaining in the frame transfer table 521, and thus enables effective use of storage resources (i.e., the memory 113) of the channel board 11.

As described above, the channel board 11 of the storage apparatus 10 according to the embodiment transfers the frame that forms the data I/O request received from the host apparatus 2 to the processor board 12, according to the frame transfer table 521 set according to the right of ownership of the LDEV 172 set for each of the processor boards 12. This enables the reliable transfer of the data frame to the processor board 12 having the LDEV control information required for the execution of the processing of the data frame. This enables arrangement of the LDEV control information 524 in the memory 123 of each processor board 12 whose accessibility from the microprocessor is higher than the shared memory. Accordingly, this arrangement enables the microprocessor 1221 of the processor board 12 to process the data frame at high speed by utilizing the LDEV control information 524 arranged in the memory 123.

Also, the channel board 11 sets a target for frame transfer in units of the processor set 1230 which the microprocessor 1221 of the processor board 12 belongs to. Thus, the channel board 11 can appropriately control the target for the frame transfer according to the configuration of the microprocessor 1221 and the memory 123.

LDEV Reserve Process

FIG. 22 is a flowchart for explaining the details of the LDEV reserve process S1824 shown in FIG. 18. The LDEV reserve process S1824 will be described below in connection with FIG. 22.

First, the microprocessor 1221 (hereinafter called the assigned microprocessor 1221) assigned the processing of the I/O frame refers to the LDEV ownership table 523 thereby to acquire the processor board ID of the processor board 12 having the right of ownership of the LDEV 172 (hereinafter called the target LDEV 172) targeted for the processing of the I/O frame.

Then, the assigned microprocessor 1221 determines whether or not the processor board 12 (i.e., the processor board 12 having the right of ownership of the target LDEV 172) identified by the acquired processor board ID is the processor board 12 which the assigned microprocessor 1221 belongs to (at S2212). If the processor board 12 is the processor board 12 which the assigned microprocessor 1221 belongs to (YES at S2212), the processing goes to S2213. If the processor board 12 is not the processor board 12 which the assigned microprocessor 1221 belongs to (NO at S2212), the processing goes to S2214.

Note that, a situation where the processor board 12 is not the processor board 12 which the assigned microprocessor 1221 belongs to (NO at S2212) can possibly arise, for example if the right of ownership (or the contents of the LDEV ownership table 523) is changed during the duration between the instant when the I/O frame is enqueued into the frame transmission/reception queue 1231 of the processor board 12 and the instant when the processing (S2212) is started.

At S2213, the assigned microprocessor 1221 enters a job ID of the job for the execution of the processing of the I/O frame into the used LDEV table 525 so as to correspond with the target LDEV 172 in the used LDEV table 525 (at S2213). FIG. 24 shows an example of the used LDEV table 525. As shown in FIG. 24, the used LDEV table 525 is configured of one or more records each including items of: LDEV-ID 2411 and the job ID (plural IDs may be entered).

At S2214, the assigned microprocessor 1221 sends error notification to the channel board 11 that has transferred the I/O frame. Upon receipt of the notification, the assigned channel board 11 sends back an error to the host apparatus 2. After that, the processing is terminated.

LDEV Release Process

FIG. 23 is a flowchart for explaining the details of the LDEV release process S1826 shown in FIG. 18. The LDEV release process S1826 will be described below in connection with FIG. 23.

Upon completion of the processing of the I/O frame, the microprocessor 1221 (hereinafter called the assigned microprocessor 1221) assigned the processing of the I/O frame deletes the job ID entered in correspondence with the target LDEV 172, among the job IDs of the jobs that have executed the processing, from the Used LDEV table 525 (at S2311).

Inhibition of Change in Setting of Right of Ownership

The LDEV ownership manager 513 of the storage apparatus 10 inhibits (or prohibits) the change in the setting of the right of ownership for the LDEV 172 for which the job ID is entered in the Used LDEV table 525. Thus, the management apparatus 3 cannot change the setting for the LDEV 172 in the LDEV ownership table 523, the LDEV 172 having the job ID which is recorded in the Used LDEV table 525.

The inhibition of the change in the setting of the right of ownership for the target LDEV 172 during the execution of the job, as mentioned above, enables reliable prevention of a stop or a runaway of the microprocessor 1221. Such troubles may occur in a situation where the careless change in the setting of the right of ownership is made during the execution of the job, which leads to a mismatch in the LDEV control information or to destruction of the contents of a register or target data.

<In the Case Where Change in Setting of Right of Ownership is Made During Login Period>

In the case where the change in the setting of the right of ownership (or the LDEV ownership table 523) is made during the login period (exclusive of an LDEV reserve period (i.e., the period from S1824 to S1826 shown in FIG. 18)) after the completion of the frame transfer table setting process S 1814 shown in FIG. 18, the same processing as S2014 to S2026 shown in FIG. 20 is performed to update the contents of the frame transfer table 521 to the contents corresponding to the changed setting of the right of ownership.

Load Distribution Function

The processor 122 of the processor board 12 stores load information on each microprocessor 1221 belonging to the processor 122 (for example, the average usage of each microprocessor 1221) in the shared memory 15 as needed. The LDEV manager 411 of the management apparatus 3 monitors each load information set on the corresponding processor board 12 stored in the shared memory 15. If the LDEV manager 411 determines that there is a load imbalance between the processor boards 12, the LDEV manager 411 changes the contents of setting of the LDEV ownership table 523 so that the loads on the respective processor boards 12 are to be uniform.

For example if a difference (or ratio) in average usage between one processor board 12 and another processor board 12 exceeds a predetermined threshold, the LDEV manager 411 changes the contents of setting of the LDEV ownership table 523 so that the right of ownership of the high-load processor board 12 is transferred to the low-load processor board 12. Appropriate setting of the LDEV ownership table 523 is made according to the load conditions of the respective microprocessors 1221, as mentioned above. As a result, the loads on the respective microprocessors 1221 can be easily and effectively distributed.

Also, the processor 122 of the processor board 12 does real-time monitoring of load information on each processor set 1230 belonging to the processor 122 (for example, the average usage of each processor set 1230). If the processor 122 determines that there is a load imbalance between the processor sets 1230, the processor 122 changes the contents of setting of the processor set search table 5212 so as to make the loads on the respective processor sets 1230 uniform. For example if a difference (or ratio) in average usage between one processor set 1230 and another processor set 1230 exceeds a predetermined threshold, the processor 122 reallocates the LDEV 172 allocated to the high-load processor set 1230 (i.e., the LDEV 172 having the LDEV-ID which is acquired from the LUN-LDEV correspondence table 522 and associated with the LUN in the LUN 1223) to the low-load processor set 1230 (that is, the processor 122 changes the contents of the processor set ID 1225).

Appropriate setting of the frame transfer table 521 is made according to the load conditions of the respective processor sets 1230, as mentioned above. As a result, the loads on the respective microprocessors 1221 can be easily and effectively distributed.

While the embodiment has been described above, it is to be understood that the above embodiment is for the purpose of facilitating the understanding of the present invention and is not intended to restrict the present invention. Changes and modifications may be made to the embodiment without departing from the basic concept and scope of the invention, and equivalents of the invention is included within the invention.

The invention claimed is:

1. A storage apparatus comprising:
at least one channel board that receives a data I/O request sent from an external apparatus;
at least one drive board that performs any one of writing and reading of data to and from a storage device including a plurality of storage drives, in response to the received data I/O request;
a cache memory that stores write data that is to be written to the storage device, or read data that is read from the storage device;
a plurality of processor boards that transfer data between any two of the channel board, the drive board, and the cache memory; and
a shared memory accessible from the processor boards,
wherein the processor boards each include a microprocessor, and a local memory whose accessibility from the microprocessor is higher than the shared memory,
the storage device provides a storage area of the storage drives in units of an LDEV being a logical storage area,
the channel board stores a frame transfer table containing information indicative of correspondence between the LDEV and each of the processor boards, the correspondence set in accordance with a right of ownership that is a right of access to the LDEV set for each of the processor boards,
each of the processor boards stores, in the local memory, LDEV control information as information which each processor board refers to at a time of access to the LDEV for which the processor board has the right of ownership,
each of the processor boards stores LDEV control information in the local memory, the LDEV control information being information to be referred to by the processor board at the time of access to the LDEV for which the processor board has the right of ownership, and
the channel board transfers a data frame that forms the received data I/O request, to one of the processor boards corresponding to the LDEV specified from the information contained in the data frame in the frame transfer table.

2. The storage apparatus according to claim 1, wherein the frame transfer table contains information indicative of correspondence between the LDEV and a processor set being a set of one or more of the microprocessors, as the information indicative of the correspondence between the LDEV and each of the processor boards, and
the channel board transfers a data frame that forms the received data I/O request, to the processor set of the processor boards having the processor set corresponding to the LDEV specified from the information contained in the data frame by referring to the frame transfer table.

3. The storage apparatus according to claim 1, wherein any one of the shared memory and the local memory stores an LDEV ownership table as information indicative of the right of ownership,
any one of the shared memory and the local memory stores a correspondence table indicative of correspondence among the channel board, a port and the LDEV, the port included in the channel board for communication with the external apparatus, and
when a login frame as a data frame for the external apparatus to log in to the storage apparatus is received from the external apparatus, the channel board specifies, by using the correspondence table, the processor board having the right of ownership of the LDEV corresponding to the channel board and a port number of the port of the received login frame, thereby acquires correspondence between the LDEV and the processor board, and sets the acquired correspondence in the frame transfer table.

4. The storage apparatus according to claim 3, wherein when one of the processor boards receives a logout frame from the external apparatus, as a data frame for the external apparatus to log out of the storage apparatus, the processor board nullifies the correspondence between the LDEV and the processor board for the external apparatus that has sent the logout frame, in the frame transfer table.

5. The storage apparatus according to claim 3, wherein the storage apparatus is communicatively coupled to a management computer capable of accessing the shared memory, and
the LDEV ownership table is configurable by the management apparatus.

6. The storage apparatus according to claim 5, further comprising an LDEV ownership manager, wherein
the storage apparatus stores a used LDEV table in which, for each of the LDEVs, information indicating whether or not a job based on the data I/O request for the LDEV is being executed, and
the LDEV ownership manager inhibits a change in setting of the ownership for the LDEV, if information indicating that the job for the LDEV is being executed is set in the used LDEV table.

7. The storage apparatus according to claim 5, wherein each of the processor boards stores load information on the microprocessors in the shared memory, when necessary, and
the LDEV ownership table is set by the management apparatus so that the loads on the microprocessors become uniform.

8. The storage apparatus according to claim 2, wherein each of the processor boards monitors load information on the processor sets, and sets the correspondence between the LDEV and the processor set in the frame transfer table so that the loads on the processor sets become uniform.

9. The storage apparatus according to claim 1, wherein the LDEV control information is at least any one of information on exclusive control of the LDEV from the microprocessor, information indicative of the presence or absence of a reserve request from the external apparatus to the LDEV, and information that identifies the external apparatus that has issued the reserve request.

10. A method for controlling a storage apparatus including at least one channel board that receives a data I/O request sent from an external apparatus;
at least one drive board that performs any one of the writing and reading of data to and from a storage device including a plurality of storage drives, in response to the received data I/O request;
a cache memory that stores write data that is to be written to the storage device, or read data that is read from the storage device;
a plurality of processor boards that transfers data between any two of the channel board, the drive board, and the cache memory; and
a shared memory accessible from the processor boards,
the processor boards each including a microprocessor, and a local memory whose accessibility from the microprocessor is higher than the shared memory,
the storage device providing a storage area of the storage drives in units of a LDEV being a logical storage area,
the controlling method comprising the steps of:
the channel board storing a frame transfer table containing information indicative of correspondence between the LDEV and each of the processor boards, the correspondence set in accordance with a right of ownership that is a right of access to the LDEV set for each of the processor boards;
each of the processor boards storing LDEV control information in the local memory, the LDEV control information being information to be referred to by the processor board at a time of access to the LDEV for which the processor board has the right of ownership; and
the channel board transferring a data frame that forms the received data I/O request, to one of the processor boards corresponding to the LDEV specified from the information contained in the data frame in the frame transfer table.

11. The method for controlling a storage apparatus according to claim 10, wherein
the frame transfer table contains information indicative of correspondence between the LDEV and a processor set being a set of one or more of the microprocessors, as the information indicative of the correspondence between the LDEV and each of the processor boards, and
the channel board transfers a data frame that forms the received data I/O request, to the processor set of the processor boards having the processor set corresponding to the LDEV specified from the information contained in the data frame by referring to frame transfer table.

12. The method for controlling a storage apparatus according to claim 10, wherein
any one of the shared memory and the local memory stores an LDEV ownership table as information indicative of the right of ownership,
any one of the shared memory and the local memory stores a correspondence table indicative of correspondence among the channel board, a port and the LDEV, the port included in the channel board for communication with the external apparatus, and
when a login frame as a data frame for the external apparatus to log in to the storage apparatus is received from the external apparatus, the channel board specifies, by using the correspondence table, the processor board having the right of ownership of the LDEV corresponding to the channel board and a port number of the port of the received login frame, thereby acquires correspondence between the LDEV and the processor board, and sets the acquired correspondence in the frame transfer table.

13. The method for controlling a storage apparatus according to claim 12, wherein
when one of the processor boards receives a logout frame from the external apparatus as a data frame for the external apparatus to log out of the storage apparatus, the processor board nullifies the correspondence between the LDEV and the processor board for the external apparatus that has sent the logout frame, in the frame transfer table.

14. The method for controlling a storage apparatus according to claim 12, wherein
the storage apparatus is communicatively coupled to a management computer capable of accessing the shared memory,
the LDEV ownership table is configurable by the management apparatus,
the storage apparatus stores a used LDEV table in which, for each of the LDEVs, information indicating whether or not a job based on the data I/O request for the LDEV is being executed, and
the storage apparatus inhibits a change in setting of the ownership for the LDEV, if information indicating that the job for the LDEV is being executed is set in the used LDEV table.

* * * * *